US009817557B2

(12) United States Patent
Gresham et al.

(10) Patent No.: US 9,817,557 B2
(45) Date of Patent: Nov. 14, 2017

(54) INTERACTIVE AUDIENCE COMMUNICATION FOR EVENTS

(71) Applicant: Enthrall Sports LLC, Seattle, WA (US)

(72) Inventors: Simon Gresham, Huntington Beach, CA (US); Alan Loy McGinnis, Jr., Medina, WA (US)

(73) Assignee: Enthrall Sports LLC, Seattle, WA (US)

( * ) Notice: Subject to any disclaimer, the term of this patent is extended or adjusted under 35 U.S.C. 154(b) by 0 days.

(21) Appl. No.: 14/806,450

(22) Filed: Jul. 22, 2015

(65) Prior Publication Data

US 2017/0024094 A1 Jan. 26, 2017

(51) Int. Cl.
*G06F 3/0484* (2013.01)
*H04L 29/06* (2006.01)
*G06Q 50/00* (2012.01)

(52) U.S. Cl.
CPC ........... *G06F 3/0484* (2013.01); *G06Q 50/00* (2013.01); *H04L 65/60* (2013.01)

(58) Field of Classification Search
CPC .................................................... G06F 3/0484
USPC ........................................................ 715/753
See application file for complete search history.

(56) References Cited

U.S. PATENT DOCUMENTS

| 6,434,398 | B1 | 8/2002 | Inselberg |
| 6,650,903 | B2 | 11/2003 | Inselberg |
| 6,760,595 | B2 | 7/2004 | Inselberg |
| 6,884,171 | B2 * | 4/2005 | Eck .......... A63F 13/12 463/42 |
| 6,975,878 | B2 | 12/2005 | Inselberg |
| 6,996,413 | B2 * | 2/2006 | Inselberg .............. H04H 20/38 455/517 |
| 7,123,930 | B2 | 10/2006 | Inselberg |
| 7,248,888 | B2 | 7/2007 | Inselberg |
| 7,263,378 | B2 | 8/2007 | Inselberg |
| 7,424,304 | B2 | 9/2008 | Inselberg |
| 7,522,930 | B2 | 4/2009 | Inselberg |
| 7,587,214 | B2 | 9/2009 | Inselberg |
| 7,693,532 | B2 | 4/2010 | Inselberg |
| 7,792,539 | B2 | 9/2010 | Inselberg |
| 7,797,005 | B2 | 9/2010 | Inselberg |

(Continued)

*Primary Examiner* — Reza Nabi
*Assistant Examiner* — Daniel Rodriguez
(74) *Attorney, Agent, or Firm* — John W. Branch; Lowe Graham Jones PLLC

(57) ABSTRACT

Embodiments are directed towards managing interactive communication for events at a venue. Multiple audience devices physically located at a venue may be determined. Audience devices that may be eligible to participate in interactive events at the venue may be determined based on their characteristics. A skin for a user interface may be determined based on the interactive events and the characteristics of the eligible audience devices. If interaction messages that indicate user participation in the interactive events are provided by the eligible audience devices, additional actions may be performed, including: generating interim results associated with the pending interactive event based on the interaction messages; and displaying content on displays at the venue that reflect updated interim results. If the pending interactive events may be complete, a final result may be generated based on the interim results and displayed as content on the displays at the venue.

28 Claims, 14 Drawing Sheets

(56) References Cited

U.S. PATENT DOCUMENTS

| | | |
|---|---|---|
| 7,856,242 B2 | 12/2010 | Inselberg |
| 7,860,523 B2 | 12/2010 | Inselberg |
| 8,023,977 B2 | 9/2011 | Inselberg |
| 8,131,279 B2 | 3/2012 | Inselberg |
| 8,213,975 B2 | 7/2012 | Inselberg |
| 8,412,172 B2 | 4/2013 | Inselberg |
| 8,423,005 B2 | 4/2013 | Inselberg |
| 8,782,533 B2* | 7/2014 | Kravtsova .......... H04N 7/17318 715/751 |
| 9,143,828 B2 | 9/2015 | Inselberg |
| 9,584,874 B1* | 2/2017 | Farias .............. H04N 21/25883 |
| 2003/0018725 A1* | 1/2003 | Turner .................. H04L 12/581 709/206 |
| 2003/0028525 A1* | 2/2003 | Santos .............. G06F 17/30867 |
| 2003/0200543 A1* | 10/2003 | Burns ..................... H04H 60/33 725/16 |
| 2004/0181818 A1* | 9/2004 | Heyner .................. H04H 20/38 725/146 |
| 2006/0094409 A1* | 5/2006 | Inselberg ............... G06Q 30/02 455/414.1 |
| 2006/0136173 A1* | 6/2006 | Case, Jr. ................. A63B 24/00 702/182 |
| 2006/0154657 A1* | 7/2006 | Inselberg ............... G06Q 30/02 455/418 |
| 2006/0184977 A1* | 8/2006 | Mueller .................. H04H 20/38 725/86 |
| 2007/0033625 A1* | 2/2007 | Chiu .................. G06Q 30/02 725/105 |
| 2007/0118868 A1* | 5/2007 | Zhang ..................... H04N 7/181 725/105 |
| 2007/0192785 A1* | 8/2007 | Pellinat .................. H04N 7/173 725/24 |
| 2007/0197247 A1* | 8/2007 | Inselberg ............... G06Q 30/02 455/517 |
| 2007/0202900 A1* | 8/2007 | Inselberg ................ H04H 60/33 455/500 |
| 2007/0247979 A1* | 10/2007 | Brillon ............... G06Q 30/0603 369/30.06 |
| 2007/0252891 A1* | 11/2007 | Gurley ................... G06Q 30/02 348/14.01 |
| 2008/0086379 A1* | 4/2008 | Dion .................... G06F 3/04842 705/14.1 |
| 2008/0195239 A1* | 8/2008 | Rotholtz ........... G06F 17/30749 700/94 |
| 2009/0019995 A1* | 1/2009 | Miyajima ............. G10H 1/0025 84/625 |
| 2009/0049979 A1* | 2/2009 | Naik ........................ G10H 1/40 84/636 |
| 2009/0209350 A1* | 8/2009 | Kelly ..................... G06Q 20/04 463/42 |
| 2009/0222392 A1* | 9/2009 | Martin .................. G11B 27/105 706/46 |
| 2009/0276292 A1* | 11/2009 | Inselberg ........... G06Q 30/0258 455/517 |
| 2009/0276317 A1* | 11/2009 | Dixon .................. G06Q 10/087 705/14.61 |
| 2010/0017714 A1* | 1/2010 | Agarwal ................ G06Q 10/00 715/716 |
| 2010/0077017 A1* | 3/2010 | Martinez ................. H04L 67/18 709/201 |
| 2010/0088159 A1* | 4/2010 | Henshaw ............... G06Q 10/02 715/716 |
| 2010/0179864 A1* | 7/2010 | Feldman ................ G06Q 30/02 705/12 |
| 2010/0194703 A1* | 8/2010 | Fedor ..................... G06Q 30/02 345/173 |
| 2010/0210253 A1* | 8/2010 | Brown ..................... H04M 1/22 455/418 |
| 2010/0228740 A1* | 9/2010 | Cannistraro ...... G06F 17/30749 707/748 |
| 2011/0004330 A1* | 1/2011 | Rothkopf ............. G11B 27/105 700/94 |
| 2011/0066943 A1* | 3/2011 | Brillon ............... G06Q 30/0603 715/716 |
| 2011/0245944 A1* | 10/2011 | Louboutin ........... G10H 1/0058 700/94 |
| 2011/0295843 A1* | 12/2011 | Ingrassia, Jr. ..... G06F 17/30053 707/723 |
| 2011/0313824 A1* | 12/2011 | Lara ...................... G06Q 30/00 705/14.1 |
| 2011/0314388 A1* | 12/2011 | Wheatley ............. G11B 27/034 715/751 |
| 2012/0084364 A1* | 4/2012 | Sivavakeesar ...... H04L 12/1818 709/205 |
| 2012/0087637 A1* | 4/2012 | Logan .................... H04H 20/28 386/241 |
| 2012/0142428 A1* | 6/2012 | Wilson .................... A63F 13/79 463/42 |
| 2012/0158531 A1* | 6/2012 | Dion ...................... G06Q 10/10 705/26.1 |
| 2012/0185324 A1* | 7/2012 | Inselberg ........... G06Q 30/0242 705/14.41 |
| 2012/0278875 A1* | 11/2012 | Kissinger ............... G06Q 30/02 726/7 |
| 2013/0031594 A1* | 1/2013 | Sansom ............. G06F 17/3082 725/114 |
| 2013/0070093 A1* | 3/2013 | Rivera ................. G11B 27/002 348/143 |
| 2013/0191454 A1* | 7/2013 | Oliver .................... G06Q 10/10 709/204 |
| 2013/0205243 A1* | 8/2013 | Rivera ................. G06F 3/04817 715/776 |
| 2013/0326373 A1* | 12/2013 | Lisabeth ................ H04L 51/32 715/753 |
| 2013/0346864 A1* | 12/2013 | Feldman ............... G06F 3/0488 715/719 |
| 2014/0025836 A1* | 1/2014 | Gupta ................ H04N 21/8456 709/231 |
| 2014/0035855 A1* | 2/2014 | Feldman ............... G06F 3/0488 345/173 |
| 2014/0047074 A1* | 2/2014 | Chung .................... H04L 67/32 709/219 |
| 2014/0157325 A1* | 6/2014 | Jabara ............. H04N 21/64322 725/59 |
| 2014/0280727 A1* | 9/2014 | Richards ................. H04L 67/20 709/217 |
| 2014/0331242 A1* | 11/2014 | De La Garza ... H04N 21/44218 725/12 |
| 2014/0380167 A1* | 12/2014 | Bloch ................ H04N 21/4307 715/723 |
| 2015/0011277 A1* | 1/2015 | Wakeford ............... A63F 13/00 463/1 |
| 2015/0106025 A1* | 4/2015 | Keller ................... G06Q 10/101 702/19 |
| 2015/0106444 A1* | 4/2015 | Schneider ......... G06F 17/30772 709/204 |
| 2015/0153998 A1* | 6/2015 | Megias .................... G06F 3/165 700/94 |
| 2015/0302086 A1* | 10/2015 | Roberts ............. G06F 17/30743 707/771 |
| 2016/0117144 A1* | 4/2016 | Soldner .................. G06F 3/165 700/94 |
| 2016/0156687 A1* | 6/2016 | Leung ................. H04L 67/2819 709/219 |
| 2016/0187138 A1* | 6/2016 | Chakraborty .......... G01C 21/20 701/491 |
| 2016/0328396 A1* | 11/2016 | Rajapakse ........... G06F 17/3002 |

* cited by examiner

INTERACTIVE AUDIENCE COMMUNICATION FOR EVENTS

TECHNICAL FIELD

The invention relates generally to communication with large venue audience members over computer networks, and more particularly, but not exclusively to interactive communication with audience members in large venues.

BACKGROUND

Large events venues, such as, sports arenas, concert halls, automobile race tracks, horse racing tracks, municipal squares/meeting halls, auditoriums, or the like, are increasingly being designed to include high-quality media systems to communicate with audience members. The media systems in modern venues often go beyond what is necessary for the communication of content, such as, scores, time information, participant/player information, or the like. Modern venues may include expansive multi-media presentation systems, such as, one or more large video screens, high quality audio, video cameras, and so on. These large high quality media systems enable operators of the venue to provide rich media that complements the main event, such as, instant replays at sporting events, audio and video segments to entertain the audience if the main event is paused (e.g., intermissions, timeouts, or the like), player/participant information, or the like, or combination thereof. However, generating content that effectively uses these multi-media venue entertainment systems to attract diverse audiences may be challenging. Modern audiences are diverse and have many entertainment options available to them. Accordingly, venues must continually adapt their media offerings to be relevant and entertaining to their audience members. Thus, it is with respect to these considerations and others that the subject innovations have been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Description of Various Embodiments, which is to be read in association with the accompanying drawings, wherein.

DETAILED DESCRIPTION OF THE VARIOUS EMBODIMENTS

Figure 1:
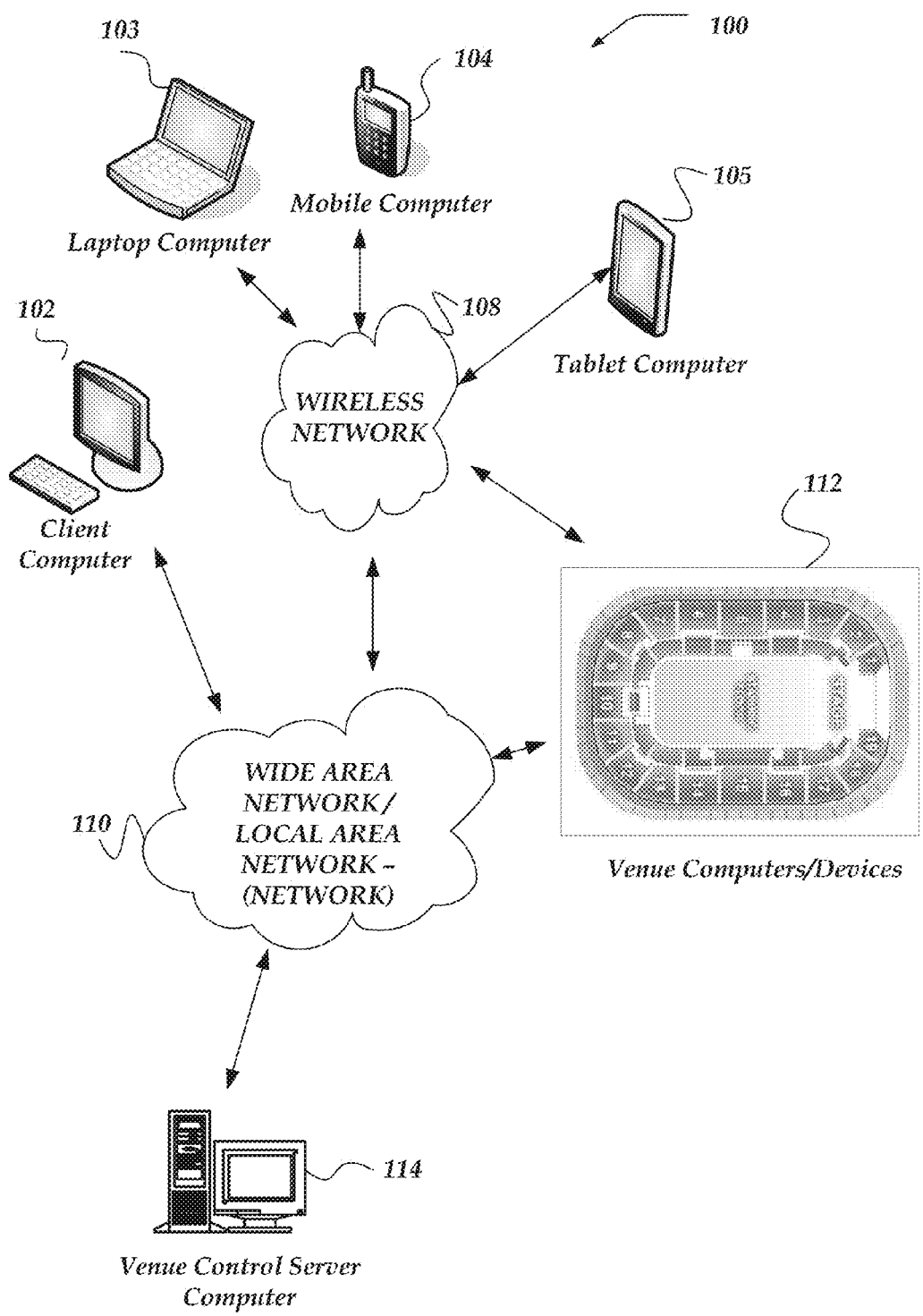
FIG. 1 is a system diagram of an environment in which embodiments of the invention may be implemented.

The present innovations now will be described more fully hereinafter with reference to the accompanying drawings, which form a part hereof, and which show, by way of illustration, specific embodiments by which the invention may be practiced. These innovations may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present innovations may be embodied as methods, computers, or devices. Accordingly, the present innovations may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "In one of the embodiments" or "in at least one of the various embodiments" as used herein does not necessarily refer to the same embodiment, though it may. Furthermore, the phrase "in another embodiment" as used herein does not necessarily refer to a different embodiment, although it may. Thus, as described below, various embodiments of the innovations may be readily combined, without departing from the scope or spirit of the innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein the term "venue" refers to facilities/locations, such as, sports arenas, race tracks, horse race tracks, auditoriums, theaters, ice rinks, gyms, stadiums, swimming pools, swimming complexes, tennis courts, baseball parks, concert halls, music halls, or the like. Venues are places where people can participate and/or observe sporting competitions, music performances, meeting, speeches, conventions, exhibitions, and so on. Venues may often include one or more media systems, such as, video displays, scoreboards, public address systems, speakers, or the like. Venues may include temporary facilities as well as permanent facilities.

As used herein the terms "venue display," or "venue media display" refer to video/media display systems that are designed to display, or in the case of audio media, play media at venues to venue audiences. For example, sports arena venues often have one or more large video displays ("big screens") to display various content, such as, instant replays, participant information, scores, audience information, or the like.

As used herein the term "audience device" refers to mobile computer, client computer, smart phone, or other similar device that is in the possession and/or control of an audience member.

As used herein the term "interactive event" refers to an in venue activity that encourages audience engagement by enabling audience members to interact with the event using their audience devices. Interactive events may include games, polls, voting, message sharing, media sharing, or the like. Some interactive events may be displayed on venue displays and enable interaction from the audience by way of one or more applications executing on their audience devices.

As used herein the term "interaction message" refers to a message generated by an audience device that represents one or more user interactions that correspond to an interactive event. The format, context, and content of each interaction message may vary depending on the interactive event that in progress. For example, if the interactive event is a game, the interaction messages may represent the actions made by audience members using their audience devices to play the game.

The following briefly describes the embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

Briefly stated, embodiments are directed towards managing interactive communication for events at a venue. In at least one of the various embodiments, multiple audience devices that may be physically located at a venue may be determined.

In at least one of the various embodiments, one or more audience devices that may be eligible to participate in one or more interactive events at the venue may be determined based on one or more characteristics of the audience devices.

In at least one of the various embodiments, a skin for a user interface that may be displayed at each of the one or more eligible audience devices may be determined based on the one or more interactive events and the one or more characteristics of the one or more eligible audience devices, such that the skinned user interface may enable one or more users of the one or more eligible audience devices to participate in the one or more interactive events.

In at least one of the various embodiments, if one or more interaction messages that indicate participation in the one or more interactive events are provided by the one or more eligible audience devices, additional actions may be performed, including: generating interim results associated with the pending interactive event based on the one or more interaction messages; and displaying content on displays at the venue that reflect updated interim results. In at least one of the various embodiments, the interaction messages may include information that indicates one or more preferences (e.g., votes) of users that correspond to the interactive events.

In at least one of the various embodiments, interim results may be modified based on, various factors, such as, the play history of media on the eligible audience devices, the physical location in the venue of the audience devices, the quality of media items provided by the audience devices, the content of media items provided by the audience devices, the relevancy of the media items, or the like, or combination thereof.

In at least one of the various embodiments, if the pending interactive events may be complete, a final result may be generated based on the interim results, such that the final result may be displayed as content on the displays at the venue. In at least one of the various embodiments, media information may be obtained from the eligible audience devices, such that the media information includes a list of media items that may be preferred by the users. And, in at least one of the various embodiments, venue playlists may be generated based on the obtained media information. Accordingly, media may be determined for presenting at the venue based on the venue playlists.

In at least one of the various embodiments, preview media may provided by the one or more eligible audience devices. In at least one of the various embodiments, an audience devices may be selected based on characteristics of its corresponding preview media. Accordingly, in at least one of the various embodiments, streaming media for presentation at the venue may be served to the venue by the selected audience device.

In at least one of the various embodiments, notification messages may be displayed in the skinned user interface that indicate an interactive events may be pending at the venue for participation by the audience. In at least one of the various embodiments, one or more score values that may be associated with the users may be generated and modified based on the participation of users in the interactive events.

Illustrated Operating Environment

FIG. 1 shows components of one embodiment of an environment in which embodiments of the invention may be practiced. Not all of the components may be required to practice the invention, and variations in the arrangement and type of the components may be made without departing from the spirit or scope of the innovations herein. As shown, system 100 of FIG. 1 includes local area networks (LANs)/wide area networks (WANs)—(network) 110, wireless network 108, client computers 102-105, one or more venue client computers/devices 112, and venue control server computer 114.

At least one embodiment of client computers 102-105 is described in more detail below in conjunction with FIG. 2. In one embodiment, at least some of client computers 102-105 may operate over one or more wired and/or wireless networks, such as networks 108, and/or 110. Generally, client computers 102-105 may include virtually any computer capable of communicating over a network to send and receive information, perform various online activities, offline actions, or the like. In one embodiment, one or more of client computers 102-105 may be configured to operate within a business or other entity to perform a variety of services for the business or other entity. For example, client computers 102-105 may be configured to operate as a web server, firewall, client application, media player, mobile telephone, game console, desktop computer, kiosk, audience device, point-of-sale, or the like. However, client computers 102-105 are not constrained to these services and may also be employed, for example, as for end-user computing in other embodiments. It should be recognized that more or less client computers (as shown in FIG. 1) may be included within a system such as described herein, and embodiments are therefore not constrained by the number or type of client computers employed.

Computers that may operate as client computer 102 may include computers that typically connect using a wired or wireless communications medium such as personal computers, multiprocessor systems, microprocessor-based or programmable electronic devices, network PCs, or the like. In some embodiments, client computers 102-105 may include virtually any portable computer capable of connecting to another computer and receiving information such as, laptop computer 103, mobile computer 104, tablet computers 105, or the like. However, portable computers are not so limited and may also include other portable computers such as cellular telephones, smart phones, display pagers, radio frequency (RF) devices, infrared (IR) devices, Personal Digital Assistants (PDAs), handheld computers, wearable computers, integrated devices combining one or more of the preceding computers, or the like. As such, client computers 102-105 typically range widely in terms of capabilities and features. Moreover, client computers 102-105 may access various computing applications, including a browser, or other web-based application.

A client computer may include a browser application that is configured to receive and to send web pages, web-based messages, and the like. The browser application may be configured to receive and display graphics, text, multimedia, and the like, employing virtually any web-based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), JavaScript Object Notation (JSON), or the like, to display and send a message. In one embodiment, a user of the client computer may employ the browser application to perform various activities over a network (online). However, one or more other applications may also be used to perform various online activities.

Client computers 102-105 also may include one or more other client applications that are configured to receive and/or send content between other computers. The client application may include a capability to send and/or receive content, or the like. The client application may further provide information that identifies itself, including a type, capability, name, and the like. In one embodiment, client computers 102-105 may uniquely identify themselves through any of a variety of mechanisms, including an Internet Protocol (IP) address, a phone number, Mobile Identification Number (MIN), media access control address (MAC address), an electronic serial number (ESN), operating system generated hardware identifier, or other device identifier. Such information may be provided in a network packet, or the like, sent between other client computers, venue computers/devices 112, venue control server computer 114, or other computers.

Client computers 102-105 may further be configured to include a client application that enables an end-user to log into an end-user account that may be managed by another computer, such as venue control server computer 114, or the like. Such an end-user account, in one non-limiting example, may be configured to enable the end-user to manage one or more online activities, including in one non-limiting example, search activities, social networking activities, browse various websites, participate in multi-player games, communicate with other users, perform one or more financial activities, online banking, online investment management, or the like. However, participation in such online activities may also be performed without logging into the end-user account.

Wireless network 108 is configured to couple client computers 103-105, and venue computers/devices 112 and their components with network 110. Wireless network 108 may include any of a variety of wireless sub-networks that may further overlay stand-alone ad-hoc networks, and the like, to provide an infrastructure-oriented connection for client computers 103-105, and some or all of venue computer/devices 112. Such sub-networks may include mesh networks, Wireless LAN (WLAN) networks, cellular networks, and the like. In one embodiment, the system may include more than one wireless network.

Wireless network 108 may further include an autonomous system of terminals, gateways, routers, and the like connected by wireless radio links, and the like. These connectors may be configured to move freely and randomly and organize themselves arbitrarily, such that the topology of wireless network 108 may change rapidly.

Wireless network 108 may further employ a plurality of access technologies including 2nd (2G), 3rd (3G), 4th (4G) 5th (5G) generation radio access for cellular systems, WLAN, Wireless Router (WR) mesh, Wi-Fi, Bluetooth, Bluetooth LE, Near Field Communicate (NFC), or the like. Access technologies such as 2G, 3G, 4G, 5G, and future access networks may enable wide area coverage for mobile computers, such as client computers 103-105 with various degrees of mobility. In one non-limiting example, wireless network 108 may enable a radio connection through a radio network access such as Global System for Mobil communication (GSM), General Packet Radio Services (GPRS), Enhanced Data GSM Environment (EDGE), code division multiple access (CDMA), time division multiple access (TDMA), Wideband Code Division Multiple Access (WCDMA), High Speed Downlink Packet Access (HSDPA), Long Term Evolution (LTE), and the like. In essence, wireless network 108 may include virtually any wireless communication mechanism by which information may travel between client computers 103-105 and another computer, network, or the like.

Network 110 is configured to couple network computers with other computers, including, venue control server computer 114, client computers 102-105, venue computers/devices 112 through wireless network 108, or the like. Network 110 is enabled to employ any form of computer readable media for communicating information from one electronic device to another. Also, network 110 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. In addition, communication links within LANs typically include twisted wire pair or coaxial cable, while communication links between networks may utilize analog telephone lines, full or fractional dedicated digital lines including T1, T2, T3, and T4, and/or other carrier mechanisms including, for example, E-carriers, Integrated Services Digital Networks (ISDNs), Digital Subscriber Lines (DSLs), wireless links including satellite links, or other communications links known to those skilled in the art. Moreover, communication links may further employ any of a variety of digital signaling technologies, including without limit, for example, DS-0, DS-1, DS-2, DS-3, DS-4, OC-3, OC-12, OC-48, or the like. Furthermore, remote computers and other related electronic devices could be remotely connected to either LANs or WANs via a modem and temporary telephone link. In one embodiment, network 110 may be configured to transport information of an Internet Protocol (IP).

Additionally, communication media typically embodies computer readable instructions, data structures, program modules, or other transport mechanism and includes any information delivery media. By way of example, communication media includes wired media such as twisted pair, coaxial cable, fiber optics, wave guides, and other wired media and wireless media such as acoustic, RF, infrared, and other wireless media.

One embodiment of venue control server computer 114 is described in more detail below in conjunction with FIG. 3. Briefly, however, venue control server computer 114 includes virtually any network computer capable of managing the running one or more interactive venue applications and/or venue control applications, audience management applications, media servers, communication servers, databases, or the like, or combination thereof.

Venue computers/devices 112 represent one or more computers and/or devices that comprise the media systems and control systems of a venue. Venue computers/devices 112 may include control server computers, routers, switches, media display systems, media inputs systems, audience management computers (e.g., ticketing systems), venue security systems, or the like. Venue computers/device 112 may be comprised of one or more network computer, client computer, or the like, as described below. In some embodiments, one or more of venue computers may be hosted in a cloud-based environment.

Although FIG. 1 illustrates venue control server computer 114 as a single computer, the innovations and/or embodiments are not so limited. For example, one or more functions of venue control server computer 114 may be distributed across one or more distinct network computers. Moreover, venue control server computer 114 is not limited to a particular configuration. Thus, in one embodiment, venue control server computer 114 may be implemented using a plurality of network computers. In other embodiments, the venue control server computer 114 may operate as a plurality of network computers within a cluster architecture, a peer-to-peer architecture, or the like. Further, in at least one of the various embodiments, one or more venue control server computers may be implemented using one or more cloud instances in one or more cloud networks. Accordingly, these innovations and embodiments are not to be construed as being limited to a single environment, and other configurations, and architectures are also envisaged.

Illustrative Client Computer

Figure 2:
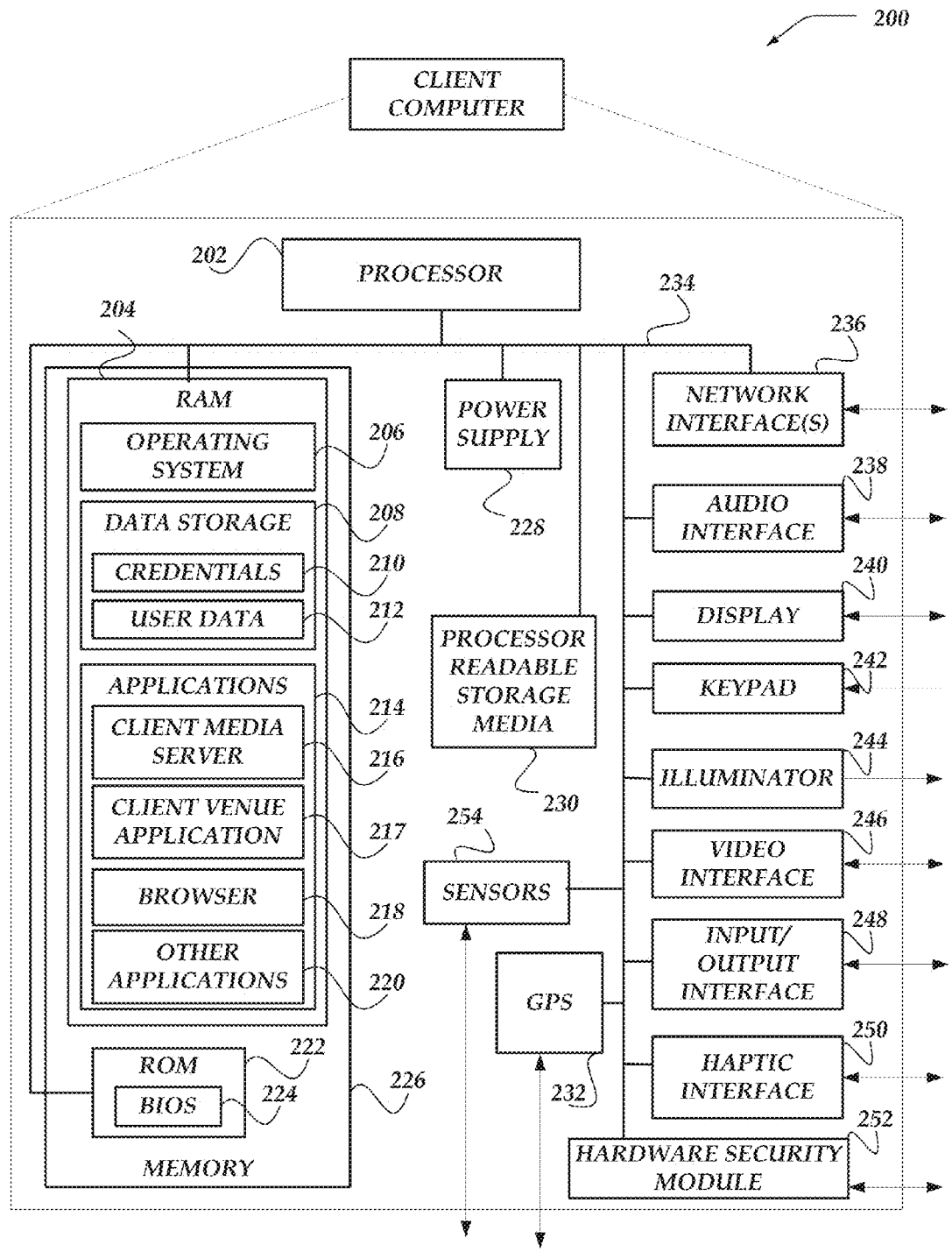
FIG. 2 shows an embodiment of a client computer that may be included in a system such as that shown in FIG. 1.

FIG. 2 shows one embodiment of client computer 200 that may be included in a system in accordance with at least one of the various embodiments. Client computer 200 may include many more or less components than those shown in FIG. 2. However, the components shown are sufficient to disclose an illustrative embodiment for practicing the present innovations. Client computer 200 may represent, for example, one embodiment of at least one of client computers 102-105 of FIG. 1.

As shown in the figure, client computer 200 includes a processor 202 in communication with a mass memory 226 via a bus 234. In some embodiments, processor 202 may include one or more central processing units (CPU). Client computer 200 also includes a power supply 228, one or more network interfaces 236, an audio interface 238, a display 240, a keypad 242, an illuminator 244, a video interface 246, an input/output interface 248, and a haptic interface 250. In some embodiments, a client computer may include components such as hardware security module 252, or a global positioning system (GPS) receiver 232.

Power supply 228 provides power to client computer 200. A rechargeable or non-rechargeable battery may be used to provide power. The power may also be provided by an external power source, such as an alternating current (AC) adapter or a powered docking cradle that supplements and/or recharges a battery.

Client computer 200 may optionally communicate with a base station (not shown), or directly with another computer. Network interface 236 includes circuitry for coupling client computer 200 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultra wide band (UWB), IEEE 802.16 Worldwide Interoperability for Microwave Access (WiMax), session initiated protocol/real-time transport protocol (SIP/RTP), WI-FI, or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 200 also comprises input/output interface 248 for communicating with external devices, such as a headset, or other input or output devices not shown in FIG. 2. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 200 in a particular way when another user of a computer is calling. In some embodiments, haptic interface 250 may be optional.

Client computer 200 may also include GPS transceiver 232 to determine the physical coordinates of client computer 200 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, tri-angulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 200 on the surface of the Earth. It is understood that under different conditions, GPS transceiver 232 can determine a physical location within millimeters for client computer 200; and in other cases, the determined physical location may be less precise, such as within a meter or significantly greater distances. In one embodiment, however, client computer 200 may through other components, provide other information that may be employed to determine a physical location of the computer, including for example, a Media Access Control (MAC) address, IP address, or the like.

Further, client computer 200 may also comprise hardware security module (HSM) 252 for providing additional safeguards for generating, storing and/or using security/cryptographic information such as, keys, digital certificates, passwords, passphrases, two-factor authentication information, cryptographic hashing, or the like. In some embodiments, hardware security module may be employed to support one or more standard public key infrastructures (PKI), and may be employed to generate, manage, and/or store public/private key pairs, or the like. In some embodiments, HSM 252 may be a stand-alone client computer, in other cases, HSM 252 may be arranged as a hardware card that may be added to a client computer. In some embodiments, HSM 252 may be arranged to provide hardware accelerated cryptography and/or compression of data.

Client computer 200 may also include sensors 254 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 254 may be one or more hardware sensors that collect and/or measure data that is external to client computer 200.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224, or the like, for controlling low-level operation of client computer 200. The mass memory also stores an operating system 206 for controlling the operation of client computer 200. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system, or the like. The operating system may include, or interface with a Java virtual machine module, or the like, that enables control of hardware components and/or operating system operations via application programs.

Mass memory 226 further includes one or more data storage 208, which can be utilized by client computer 200 to store, among other things, applications 214 and/or other data. For example, data storage 208 may also be employed to store information that describes various capabilities of client computer 200. The information may then be provided to another computer based on any of a variety of events, including being sent as part of a header during a communication, sent upon request, or the like. Data storage 208 may also be employed to store social networking information including address books, buddy lists, aliases, user profile information, or the like. Further, data storage 208 may also store messages, web page content, or any of a variety of user generated content. Further, data storage 208 may be used for storing credentials 210 that may be employed for identify users. Also, data storage may employed for storing user data 212 that may include information related to interactive audience communication for events, such as, media play lists, game scores, activity progress/history, preference information, privacy settings, or the like, or combination thereof.

At least a portion of the information stored in data storage 208 may also be stored on another component of client computer 200, including, but not limited to non-transitory processor readable storage media 230, a disk drive or other computer readable storage devices (not shown) within client computer 200.

Processor readable storage media 230 may include volatile, non-transitory, non-transitive, nonvolatile, removable, and non-removable media implemented in any method or technology for storage of information, such as computer or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, solid state drives (SSD), magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 200, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, client media server 216, client venue application 217, a browser 218, and other applications 220.

Browser 218 may include virtually any application configured to receive and display graphics, text, multimedia, messages, and the like, employing virtually any web based language. In one embodiment, the browser application is enabled to employ HDML, WML, WMLScript, JavaScript, SGML, HTML, HTML5, XML, and the like, to display and send a message. However, any of a variety of other web-based programming languages may be employed. In one embodiment, browser 218 may enable a user of client computer 200 to communicate with another network computer, such as venue control server computer 114 shown in FIG. 1.

Other applications 220 may include, but are not limited to, calendars, search programs, email clients, IM applications, SMS applications, voice over Internet Protocol (VOIP) applications, contact managers, task managers, transcoders, database programs, word processing programs, security applications, spreadsheet programs, games, search programs, and so forth.

Additionally, in one or more embodiments (not shown in the figures), client computer 200 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the client computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Network Computer

Figure 3:
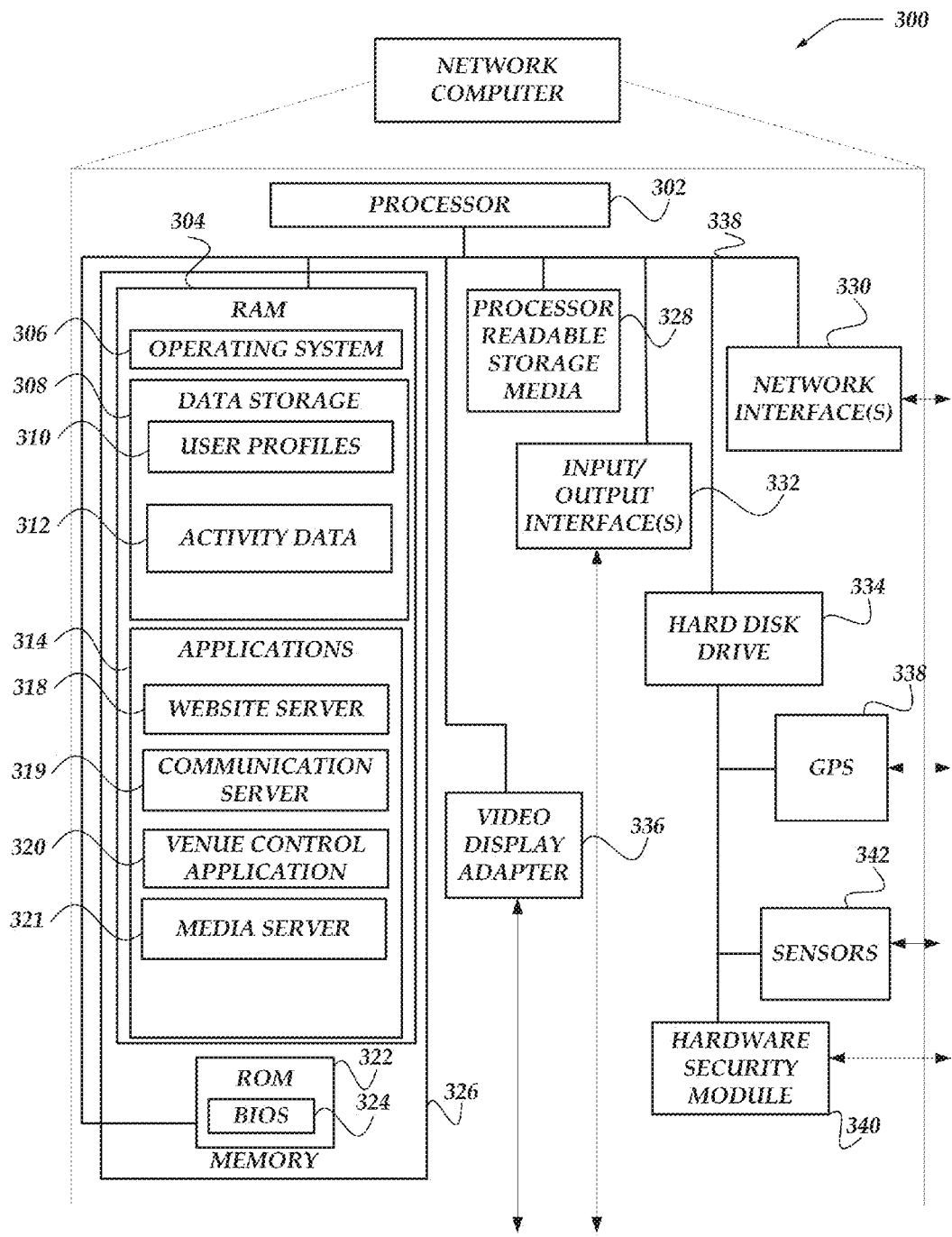
FIG. 3 shows an embodiment of a network computer that may be included in a system such as that shown in FIG. 1.

FIG. 3 shows one embodiment of a network computer 300, according to one embodiment of the invention. Network computer 300 may include many more or less components than those shown. The components shown, however, are sufficient to disclose an illustrative embodiment for practicing the invention. Network computer 300 may be configured to operate as a server, client, peer, a host, cloud instance, or any other computer. Network computer 300 may represent, for example venue control server computer 114, one or more of venue computers/devices 112, and/or other network computers.

Network computer 300 may include processor 302, processor readable storage media 328, network interface unit 330, an input/output interface 332, hard disk drive 334, hardware security module 340, video display adapter 336, and memory 326, all in communication with each other via bus 338. In some embodiments, processor 302 may include one or more central processing units. In at least one of the various embodiments, network computer 300 may include global positioning system (GPS) receiver 338.

As illustrated in FIG. 3, network computer 300 also can communicate with the Internet, or other communication networks, via network interface unit 330, which is constructed for use with various communication protocols including the TCP/IP protocol. Network interface unit 330 is sometimes known as a transceiver, transceiving device, or network interface card (NIC).

Network computer 300 also comprises input/output interface 332 for communicating with external devices, such as a keyboard, or other input or output devices not shown in FIG. 3. Input/output interface 332 can utilize one or more communication technologies, such as USB, infrared, NFC, Bluetooth, Bluetooth LE, or the like.

Network computer 300 may also include GPS transceiver 338 to determine the physical coordinates of network computer 300 on the surface of the Earth. GPS transceiver 338, in some embodiments, may be optional. GPS transceiver 338 typically outputs a location as latitude and longitude values. However, GPS transceiver 338 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of network computer 300 on the surface of the Earth. It is understood that under different conditions, GPS transceiver 338 can determine a physical location within millimeters for network computer 300; and in other cases, the determined physical location may be less precise, such as within a meter or significantly greater distances. In one embodiment, however, network computer 300 may through other components, provide other information that may be employed to determine a physical location of the computer, including for example, a Media Access Control (MAC) address, IP address, or the like.

Further, network computer 300 may also comprise hardware security module (HSM) 340 for providing additional safeguards for generating, storing and/or using security/cryptographic information such as, keys, digital certificates, passwords, passphrases, two-factor authentication information, personal identification numbers, or the like. In some embodiments, hardware security module may be employed to support one or more standard public key infrastructures (PKI), and may be employed to generate, manage, and/or store keys pairs, or the like. In some embodiments, HSM 340 may be a stand-alone network computer, in other cases, HSM 340 may be arranged as a hardware card that may be added to a network computer. In some embodiments, HSM 340 may be arranged to provide hardware accelerated cryptography and/or compression of data.

Network computer 300 may also include sensors 342 for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), light monitoring, audio monitoring, motion sensors, or the like. Sensors 342 may be one or more hardware sensors that collect and/or measure data that is external to network computer 300.

Memory 326 generally includes RAM 304, ROM 322 and one or more permanent mass storage devices, such as hard disk drive 334, tape drives, solid state drives, optical drives, and/or floppy disk drives. Memory 326 stores operating system 306 for controlling the operation of network computer 300. Any general-purpose operating system may be employed. Basic input/output system (BIOS) 324 is also provided for controlling the low-level operation of network computer 300.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, non-transitory, non-transitive, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, thumb drives, memory cards, or any other media which can be used to store the desired information and which can be accessed by a computer.

Memory 326 further includes one or more data storage 308, which can be utilized by network computer 300 to store, among other things, applications 314 and/or other data. For example, data storage 308 may also be employed to store information that describes various capabilities of network computer 300. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 300, including, but not limited to processor readable storage media 328, hard disk drive 334, or other computer readable storage medias (not shown) within network computer 300.

Data storage 308 may include a database, text, spreadsheet, folder, file, or the like, that may be configured to maintain and store user account identifiers, user profiles, email addresses, IM addresses, and/or other network addresses; or the like. Data storage 308 may further include program code, data, algorithms, and the like, for use by a processor, such as processor 302 to execute and perform actions. In one embodiment, at least some of data store 308 might also be stored on another component of network computer 300, including, but not limited to processor-readable storage media 328, hard disk drive 334, or the like.

Data storage 308 may be used for storing user profile information 310 that may be employed for interactive communication with audience members (users). Also, data storage 308 may employed for storing activity data 312 that may include information related to interactive audience communication for events, such as, media play lists, game scores, activity progress/history, preference information, privacy settings, or the like, or combination thereof.

Applications 314 may include computer executable instructions, which may be loaded into mass memory and run on operating system 306. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 314 may also include website server 318, communication server 319, venue control application 320, or media application 321.

Website server 318 may represent any of a variety of information and services that are configured to provide content, including messages, over a network to another computer. Thus, website server 318 can include, for example, a web server, a File Transfer Protocol (FTP) server, a database server, a content server, email server, or the like. Website server 318 may provide the content including messages over the network using any of a variety of formats including, but not limited to WAP, HDML, WML, SGML, HTML, HTML5, XML, Compact HTML (cHTML), Extensible HTML (xHTML), or the like.

Additionally, in one or more embodiments (not shown in the figures), network computer 300 may include an embedded logic hardware device instead of a CPU, such as, an Application Specific Integrated Circuit (ASIC), Field Programmable Gate Array (FPGA), Programmable Array Logic (PAL), or the like, or combination thereof. The embedded logic hardware device may directly execute its embedded logic to perform actions. Also, in one or more embodiments (not shown in the figures), the network computer may include a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

Illustrative Logical System Architecture

Figure 4:
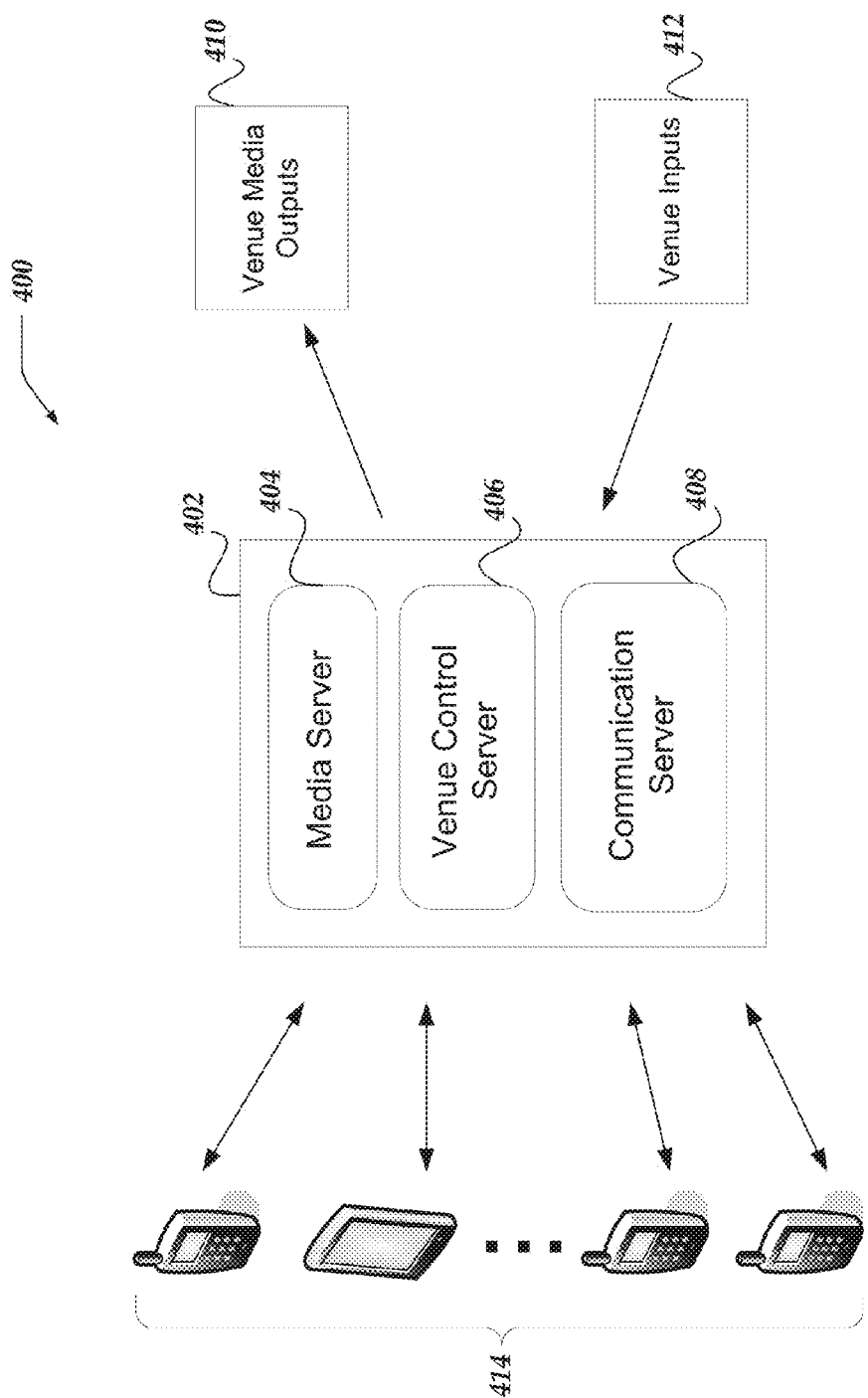
FIG. 4 shows an overview of architecture for a system for interactive audience communication for events, in accordance with at least one of the various embodiments.

FIG. 4 shows an overview of architecture for system 400 for interactive audience communication for events, in accordance with at least one of the various embodiments. In at least one of the various embodiments, system 400 may include one or more venue control server computers, such as, venue control server computer 402. Further, in at least one of the various embodiments, venue control server computer 402 may include one or more applications or components, such as, media server 404, venue control server 406, communication server 408, or the like.

Also, in at least one of the various embodiments, venue control server computer 402 may be coupled with one or more mobile computers over one or more networks, such as, audience devices 414. Audience devices 414 represents client computers, such as, mobile computers, that are possessed by audience members of an event. In at least one of the various embodiments, the audience members and their associated audience devices may be considered to be near and/or within a particular venue where an event is being held. For example, if a sporting event, such as, a professional hockey competition is being held in a sports arena, the arena is the venue, and the fans at the sports arena may be considered the audience members.

In at least one of the various embodiments, a venue may have one or more media output systems, such as, public address systems, sound systems, one or more video displays, one or more score boards, or the like, represented by venue media outputs 410. Likewise, in at least one of the various embodiments, venues may have one or more input systems, such as, video cameras, microphones, motion detectors, pressure pads, or the like, that are represented by venue inputs 412.

In at least one of the various embodiments, one or more venue control server computers may be located in venue control room in the venue. Or, in at least one of the various embodiments, venue control server computers may be located in a cloud-based environment that is accessible over a network. Or, in at least one of the various embodiments, one or more venue server computers may be located at the venue and one or more venue server computers may be located in a cloud-based environment.

In at least one of the various embodiments, mobile computers, such as, audience devices 414, may be arranged to include one or more client venue applications, such as, client venue application 217 (in FIG. 2). In at least one of the various embodiments, client venue applications may be an applications (app) installed on audience members mobile computers, such as, smart phones, or the like. Accordingly, in at least one of the various embodiments, audience devices 414 may be enabled to interact with components of venue control server computers, including, for example, media server 404, venue control server 406, communication server 408, or the like.

In at least one of the various embodiments, audience devices 414 may be enabled to receive data from venue control server computers, such as, control messages, application updates, notification messages, or the like, or combination thereof. Likewise, in at least one of the various embodiments, audience devices 414 may communicate one or more interaction messages to venue control server 402. Also, audience devices 414 may be enabled to communicate data to one or more venue control server computers. For example, in at least one of the various embodiments, audience devices may communicate various data to a venue control server, such as, interaction messages, media (e.g., streaming video, photos, streaming audio, and so on), media information (e.g., playlists, favorites, or the like), motion information, geolocation information (including historical information), biological sensor information, or the like. The particular information communicated by audience devices may depend on the available features and/or configuration of a given device and/or the pending interactive event. In at least one of the various embodiments, the communication between audience devices 414 and venue control server computer 402 may depend on the pending interactive event, if any.

In at least one of the various embodiments, audience devices may be registered with one or more venue control servers via one or more installed client venue applications. In at least one of the various embodiments, an audience device may be registered if the client venue application is installed and/or activated by a user.

In at least one of the various embodiments, an audience device may be arranged to actively broadcast its arrival at a known venue based on geolocation information. For example, the registration process for the audience device may include the geolocation information for one or more venues. Accordingly, if the audience device determines that it is in or near a known venue it may attempt to communicate over a network to a venue control server for the venue.

In at least one of the various embodiments, a venue control server computer may monitor one or more networks, (e.g., its Wi-Fi network) to detect if a registered audience device is attempting to join the network. For example, the venue control server may be arranged to record the MAC addresses of registered audience devices. Accordingly, if a known MAC is observer joining and/or attempting to join one of the networks monitored by the venue control server, the venue control server may determine the audience device has arrived at the venue.

In at least one of the various embodiments, the user (the audience member) may manually activate the client venue control application to communicate to the venue control server that the audience device is at the venue. In at least one of the various embodiments, the venue control server and audience devices may perform a handshake protocol to exchange/establish configuration information for the current session. For example, the audience device may provide device capability information, privacy settings, opt-in/opt-out information, or the like, the venue control servers. In some embodiments, the handshake information may be stored as an audience member profile that may be used until the user updates the profile information.

In at least one of the various embodiments, the venue control server may classify audience devices based on their capabilities. In some embodiments, devices may be classified based on their streaming media capability, screen resolutions, processing power, current battery life, available memory, camera specifications, or the like. In at least one of the various embodiments, information used for classifying audience devices may be collected and/or provided by the client venue control application. In some embodiments, user configuration/preference may influence the classification of a device. For example, audience members that opt-out of sharing streaming video may be classified as having no video capabilities. Also, in at least one of the various embodiments, audience members may provide preferences regarding how much of their device's battery life they would like to preserve. For example, an audience member may set a preference that they are willing to interact with the venue control server as long as the battery of their audience device is above 50% of expected life.

In at least one of the various embodiments, upon registering and/or arriving at the venue, the client venue application may present a user-interface that is skinned to a particular look-and-feel. In at least one of the various embodiments, the particular look-and-feel of the skin (used to modify the user-interface) may be determined based on the venue, the activity occurring at the venue, characteristics of the audience device, or the like, or combination thereof. For example, in at least one of the various embodiments, if the audience device is at the venue and a profession hockey competition the activity, the client application may be skinned in the branding of the hosting professional hockey team.

Also, in at least one of the various embodiments, the particular skin presented may also depend on the particular interactive event that is pending. For example, an interactive event that involves displaying media captured by the audience devices at the venue may have a different skin than an interactive event related to answering an audience poll question.

In at least one of the various embodiments, the venue control server may dynamically communicate skins to the audience devices over the networks. For example, if the skin information (e.g., graphics, resource files, or the like) is not on the audience devices, the client venue application may request it from the venue control server. Or, for example, the venue control server may communicate (e.g., push) the skin information to the audience device.

Figure 5:
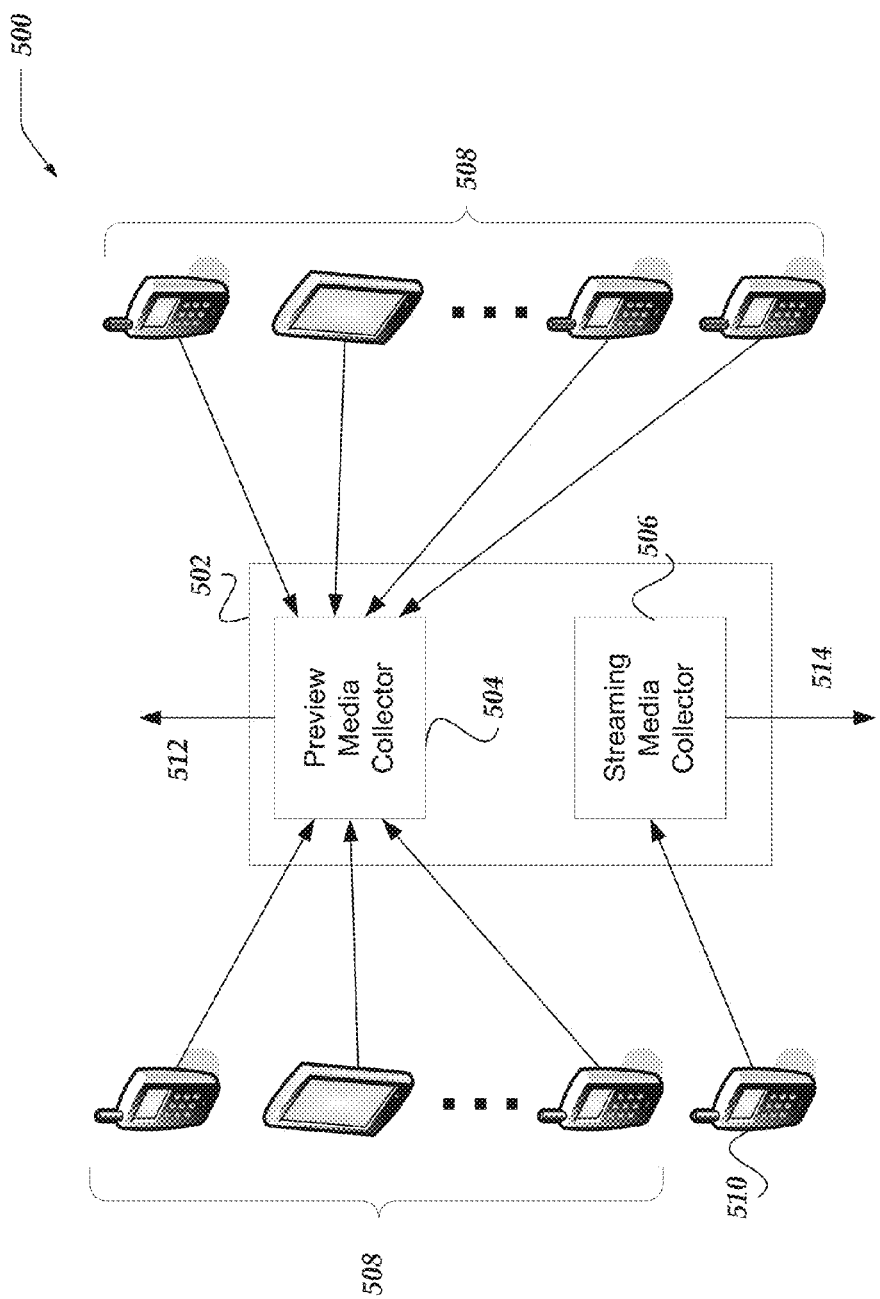
FIG. 5 shows an overview of architecture for a system for media collection and streaming for interactive audience communication for events, in accordance with at least one of the various embodiments.

FIG. 5 shows an overview of architecture for system 500 for media collection and streaming for interactive audience communication for events, in accordance with at least one of the various embodiments. In at least one of the various embodiments, a media server, such as, media server 502 may be included in a venue control server computer, such as, venue control server computer 114. In at least one of the various embodiments, media server 502 may include one or more components, such as, preview media collector 504, streaming media collector 506, or the like. In some embodiments, preview media collector 504, streaming media collector 506 may be running on separate servers or computers.

In at least one of the various embodiments, one or more interactive events initiated by a venue control server may involve sending control messages to one or more audience devices to trigger them to generate and provide media to the venue control server. For example, a venue control server may initiate an interactive event that requests audience members to provide media streams that may be evaluated for display within the venue (e.g., on a "Big Screen" of the venue). Various interactive activities, such as, games, and so on, may be arranged to enable audience members to provide streaming data to the venue control server to be selectively displayed to the entire venue.

In at least one of the various embodiments, audience devices 508 may be one or more mobile computers associated with audience members. In at least one of the various embodiments, audience devices 508 may be providing preview media information to media server 502. In at least one of the various embodiments, preview media information may include information such as thumbnail stills captured from video, meta-data, or the like. Preview media information may be provided to preview media collector 504. In at least one of the various embodiments, preview media collector may perform one or more operations on the preview media information and then forward it a venue control server for further processing.

In at least one of the various embodiments, client venue control applications may be arranged to capture and generate the preview media information from media generated by an audience device. For example, in at least one of the various embodiments, if the audience device is generating video, the client venue control application may sample frames from the video and provide them as part of the preview media information.

In at least one of the various embodiments, one or more audience devices, such as, audience device 510 may be selected to provide streaming media to streaming media collector 506. In at least one of the various embodiments, the venue control server may determine the one or more audience devices that should communicate streaming media. In some embodiments, the venue control server may communicate a control message to an audience device that indicates that it is selected to provide streaming media. Accordingly, in at least one of the various embodiments, rather sending preview media information, audience device 510 is sending streaming media directly to streaming media collector 506. Audience devices selected for providing the streaming media may serve the streaming media directly.

In at least one of the various embodiments, streaming media collector 506 may enable the streaming media served from one or more audience devices to be played on a venue media output system, such as, the public address system, large video displays, scoreboards, or the like, of combination thereof. In at least one of the various embodiments, streaming media collector 506 may be a component of media server 321, or venue control application 320, or the like.

Figure 6:
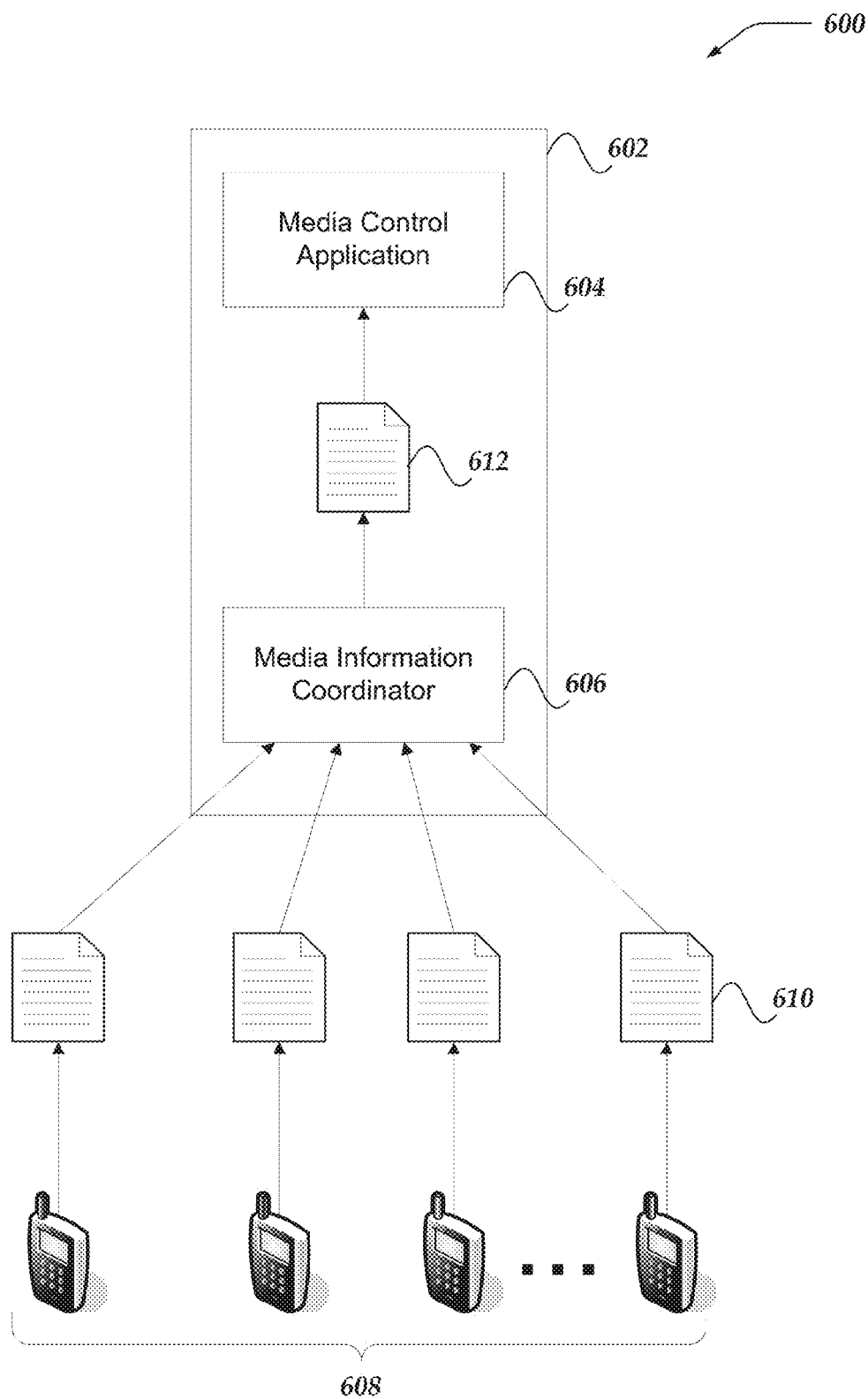
FIG. 6 shows an overview of architecture for a system for audience member media information collection for interactive audience communication for events, in accordance with at least one of the various embodiments.

FIG. 6 shows an overview of architecture for system 600 for audience member media information collection for interactive audience communication for events, in accordance with at least one of the various embodiments. In at least one of the various embodiments, a venue control server, such as, venue control server 602 may include media control application 604 and media information coordinator 606.

In at least one of the various embodiments, venue control server 602, may be arranged to collect and process media information from audience devices that are at the venue. Accordingly, in at least one of the various embodiments, media information, such as, user playlists, favorites, play history, or the like, may be collected from audience devices. This information may be compiled in into one or more venue playlists that may be incorporated into the media that is provided at the venue. For example, in some embodiments, at a sporting event, venues may play music during intermissions and/or breaks in play. Accordingly, in this example, venues may select the music that is played based on the media information collected from audience devices.

In at least one of the various embodiments, audience devices 608 may provide media information (e.g., media information 610) to media information coordinator 606. In at least one of the various embodiments, media information may be collected on the audience devices by a client venue application. In some embodiments, a user may pre-authorize the client venue application to enable it to access the media information on the audience device.

In at least one of the various embodiments, as audience devices are detected, the media information coordinator may communicate control messages to the audience devices. The control message may initiate the collection of the relevant media information and the communication of the media information to the venue control server. Media information coordinator 606 may collect the media information as it is provided by the audience devices. In at least one of the various embodiments, media information coordinator 606 may generate one or more venue playlists that may be provided to a media control application that is a component of a venue control server or media server.

In at least one of the various embodiments, media information provided by the audience device may include one or more media items. In at least one of the various embodiments, the contents of media items may include the media itself (e.g., an image, audio clip, video clip, or the like). Also, in at least one of the various embodiments, the media items may include meta-data such as a song title, quality information (e.g., resolution, sample rate, size, or the like), licensing information, author/artist information, release date, copyright information, owner information, genre information, compact disk database (CDDB) information, or the like, or combination thereof. In some embodiments, the media items and/or media information may include meta-data absent the media itself.

In at least one of the various embodiments, media information provided by an audience device may also include additional information associated with each media item, such as, number of times viewed/played, last time played, the number of playlists on the audience device that include the media item, how the media items were obtained by the user of the audience device, how long the media item has be on the audience device, or the like. In at least one of the various embodiments, this information may be used by media information coordinator 606 to determine how much the user prefers a given media item relative to the rest of the media on the user's audience device.

For example, in at least one of the various embodiments, media information coordinator 606 may be arranged to determine a particular media item that is played more times than average is more important to the user. Likewise, for example, the media information coordinator may be arranged to determine the media items that have been stored longer on the audience device are more important to the user than those media items than have been stored for less time. Also, for example, the media information coordinator may be arranged to determine the media items that are included in multiple playlists of the same user are more important to that users than other media items.

In at least one of the various embodiments, media information coordinator 606 may employ configuration information that includes one or more rule based policies that may be employed for determining the relative user preference for media items. The relative preference of a media item may be considered a preference score—though it is not limited being a single computed value. A preference score may be considered representative of the combined importance of a media item to an audience member/user. In some embodiments, the preference score may be computed as a single value used to reflect the relative importance of a given media item. In other embodiments, the preference score may be determined based on the various properties of a given media item.

In at least one of the various embodiments, media information coordinator 606 may be arranged to generate one or more venue playlists of media that may be played/displayed in the venue using the venue media systems. In at least one of the various embodiments, the media information coordinator may be arranged to use preference scores associated with the media items to generate venue playlists. In at least one of the various embodiments, media information coordinator 606 may generate a venue preference score to associate with each media item. In at least one of the various embodiments, a venue preference score for a media item may be generated based on the preference scores for the media from the various audience devices that may be contributing media information.

In at least one of the various embodiments, the venue preference score may be generated independently based on various characteristics associated with a given media item, such as, the number of audience devices that include the media item, audience member/user preference scores for the media item, or the like, or combination thereof.

In at least one of the various embodiments, other factors such as licensing restrictions may also influence a venue preference for a given media item. For example, if the media item references a song that has licensing restriction that restricts its playing at the venue, the preference score for that media item may be reduced. Note, in some cases, the venue control server may notify a venue operator/administrator if otherwise preferred media item are restricted from playing in the venue because of known licensing issues.

Similarly, in at least one of the various embodiments, some factors may cause the media information coordinator to increase the preference and/or venue preference score that is associated with a media item. For example, the venue management may have determined that a certain media item should have an increased preference score because it may be somehow associated with the event that is occurring in the venue.

In at least one of the various embodiments, media information coordinator 606 may be arranged to employ configuration information, such as, rule based policies, conditions, logic, or the like, to define one or more conditions for decreasing or increasing preference scores for both individual users (e.g., audience members) or venue preference scores.

In at least one of the various embodiments, media information coordinator 606 may generate one or more venue playlists, such as, venue playlist 612 that include sorted/prioritized lists of media items. In some embodiments, different playlists may be generated for different circumstances. For example, if the venue is hosting a sporting event, it may provide separate playlists for intermissions, half-time breaks, time-outs, key moments (e.g., defensive stand music), player introductions, or the like. In some embodiments, factors, such as, duration of the intermission, duration of the media, loudness of the media, tempo of media, or the like, may be considered by the media information coordinator. In at least one of the various embodiments, media information coordinator 606 may provide the one or more venue playlists 612 to media control application 604.

Accordingly, in at least one of the various embodiments, operators of a venue control system may employ the venue playlists when selecting music to play. In some embodiments, the venue control system may be arranged to automatically play the media based on the venue playlists.

Furthermore, in at least one of the various embodiments, client computer 200 or network computer 300 is arranged to include one or more sensors for determining geolocation information (e.g., GPS), monitoring electrical power conditions (e.g., voltage sensors, current sensors, frequency sensors, and so on), monitoring weather (e.g., thermostats, barometers, anemometers, humidity detectors, precipitation scales, or the like), or the like.

For example, in at least one embodiment, geolocation information (such as latitude and longitude coordinates, or the like) is collected by a hardware GPS sensor and subsequently employed in the identification/determination of the audience devices and/or for evaluating media provided but one or more audience devices. Similarly, in at least one embodiment, weather information (such as temperature, atmospheric pressure, wind speed, humidity, or the like) is collected by a hardware weather sensor and subsequently employed in the identification/determination of the audience devices and/or for evaluating media provided but one or more audience devices. Additionally, in at least one embodiment, electrical power information (such as voltage, current, frequency, or the like) is collected by a hardware electrical power sensor and subsequently employed in the identification/determination of the audience devices and/or for evaluating media provided but one or more audience devices.

Generalized Operations

The operation of certain aspects of the invention will now be described with respect to FIGS. 7-14. In at least one of various embodiments, processes 700, 800, 900, 1000, 1100, 1200, 1300, and 1400 described in conjunction with FIGS. 7-14, respectively, may be implemented by and/or executed on a network computer, such as network computer 300 of FIG. 3. In other embodiments, these processes or portions of these processes may be implemented by and/or executed on a plurality of network computers, such as network computer 300 of FIG. 3.

Further, in other embodiments, these processes or portions of these processes may be implemented by and/or executed on one or more client computers, such as client computer 200 as shown in FIG. 2. Also, in at least one of the various embodiments, these processes or portions of these processes may be implemented by and/or executed on one or more cloud instances operating in one or more cloud networks. However, embodiments are not so limited and various combinations of network computers, client computers, cloud computers, or the like, may be utilized.

Figure 7:
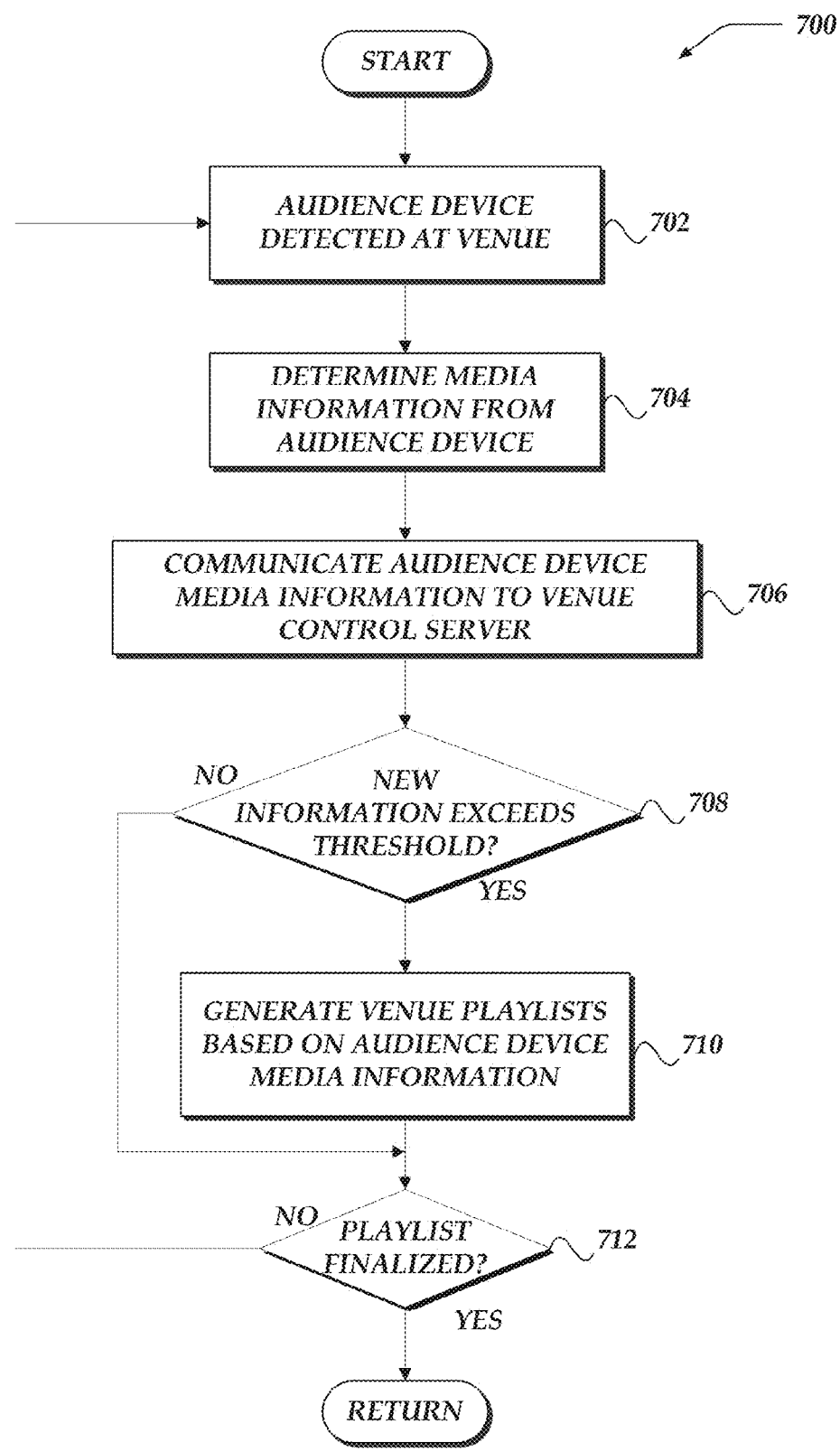
FIG. 7 shows an overview flowchart for a process for interactive audience communication for events in accordance with at least one of the various embodiments.

FIG. 7 shows an overview flowchart for process 700 for interactive audience communication for events in accordance with at least one of the various embodiments. After a start block, at block 702, in at least one of the various embodiments, one or more audience devices may be detected at a venue. In at least one of the various embodiments, as audience devices approach the venue, the client venue application may generate a message announcing its presence. In at least one of the various embodiments, the message may be provided to a venue control server over one or more wireless networks, such as, represented by wireless network 108. Also, in at least one of the various embodiments, the venue control server may monitor the one or more network to observe if a known/registered audience device has joined the network.

In at least one of the various embodiments, the venue may provide a public network (e.g., Wi-Fi, or the like). Accordingly, in some embodiments, if an audience device that may be unknown and/or unregistered connects to the network, the venue control server may generate an initial landing web page for that device that describes how a client venue application may be obtained. In some embodiments, installing a client venue application may be a pre-requisite for accessing a venue's public networks. Accordingly, in at least one of the various embodiments, a client venue application may be obtained from an application store, or other application provider and installed by the user of the audience device.

In at least one of the various embodiments, an audience device may exchange one or more handshake messages with a venue control server using the client venue application. In at least one of the various embodiments, the handshake messages provided by a client venue application, may include, audience device identifiers, geolocation information of the audience device, relevant status of the device (e.g., remaining battery life), device capabilities, or the like, or combination thereof. Accordingly, the provided handshake information may be used to validate that the audience device is eligible to participate in interactive events at the venue. For example, geolocation information can be used to confirm the audience device is at the venue.

In at least one of the various embodiments, upon registering and/or arriving at the venue, the client venue application may present a user-interface that is skinned to a particular look-and-feel. In at least one of the various embodiments, the particular look-and-feel of the skin (used to modify the user-interface) may be determined based on the venue, the activity occurring at the venue, characteristics of the audience device, or the like, or combination thereof. For example, in at least one of the various embodiments, if the audience device is at the venue and a profession hockey competition the activity, the client application may be skinned in the branding of the hosting professional hockey team.

Also, in at least one of the various embodiments, the particular skin presented may also depend on the particular interactive event that is pending. For example, an interactive event that involves displaying media captured by the audience devices at the venue may have a different skin than an interactive event related to answering an audience poll question.

In at least one of the various embodiments, the venue control server may dynamically communication skins to the audience devices over the networks. For example, if the skin information (e.g., graphics, resource files, or the like) is not on the audience devices, the client venue application may request it from the venue control server. Or, for example, the venue control server may communicate (e.g., push) the skin information to the audience device.

At block 704, in at least one of the various embodiments, media information associated with the audience devices may be determined. The client venue application may enable various types of media information to be provided to a venue control server. Media information may be collected from one or more media services/application located on the audience device. In some embodiments, the media information may be requested from one or more third party applications or services through an API provided by the third party services. In at least one of the various embodiments, as described above media information may include information related to a user's media preferences, such as, playlists, play history, and so on.

At block 706, in at least one of the various embodiments, the media information may be communicated to a venue control server. In at least one of the various embodiments, the client venue application may be arranged to communicate the media information from an audience device to a venue control server. The media information may be communicated over one or more networks, including, wireless network 108.

At decision block 708, in at least one of the various embodiments, if the amount of media information exceeds a threshold, control may flow to 710; otherwise, control may flow to decision block 712. In at least one of the various embodiments, audience members with audience devices may trickle into a venue, some arriving early some arriving late and so on. In some embodiments, there may be threshold number of "new" audience devices that have arrived that if exceeded triggers an update of the venue media control systems. In some embodiments, each time an audience device is detected its information may be immediately integrated into the venue media control systems. In some embodiments, a value, such as, 25, 50, 100, 1000, arriving audience members, or the like, may be defined as a threshold number.

At block 710, in at least one of the various embodiments, one or more venue playlists may be generated based on the media information obtained from the audience devices. In at least one of the various embodiments, the venue control server may be arranged to generate one or more venue playlists that may be sorted/ordered based on the media information that is provided by the audience members from their audience devices. In at least one of the various embodiments, as described above, the venue control server may be configured to use various factors to sort and/or prioritize the media items listed in the venue playlists as well as the venue playlists themselves. At decision block 712, in at least one of the various embodiments, if the playlists are finalized, control may be returned to a calling process; otherwise, control may loop back to block 702. In at least one of the various embodiments, the venue control server may be arranged to collect media information from a minimum number of audience devices before generating venue playlist and/or enabling them to be used in the venue media control system.

Figure 8:
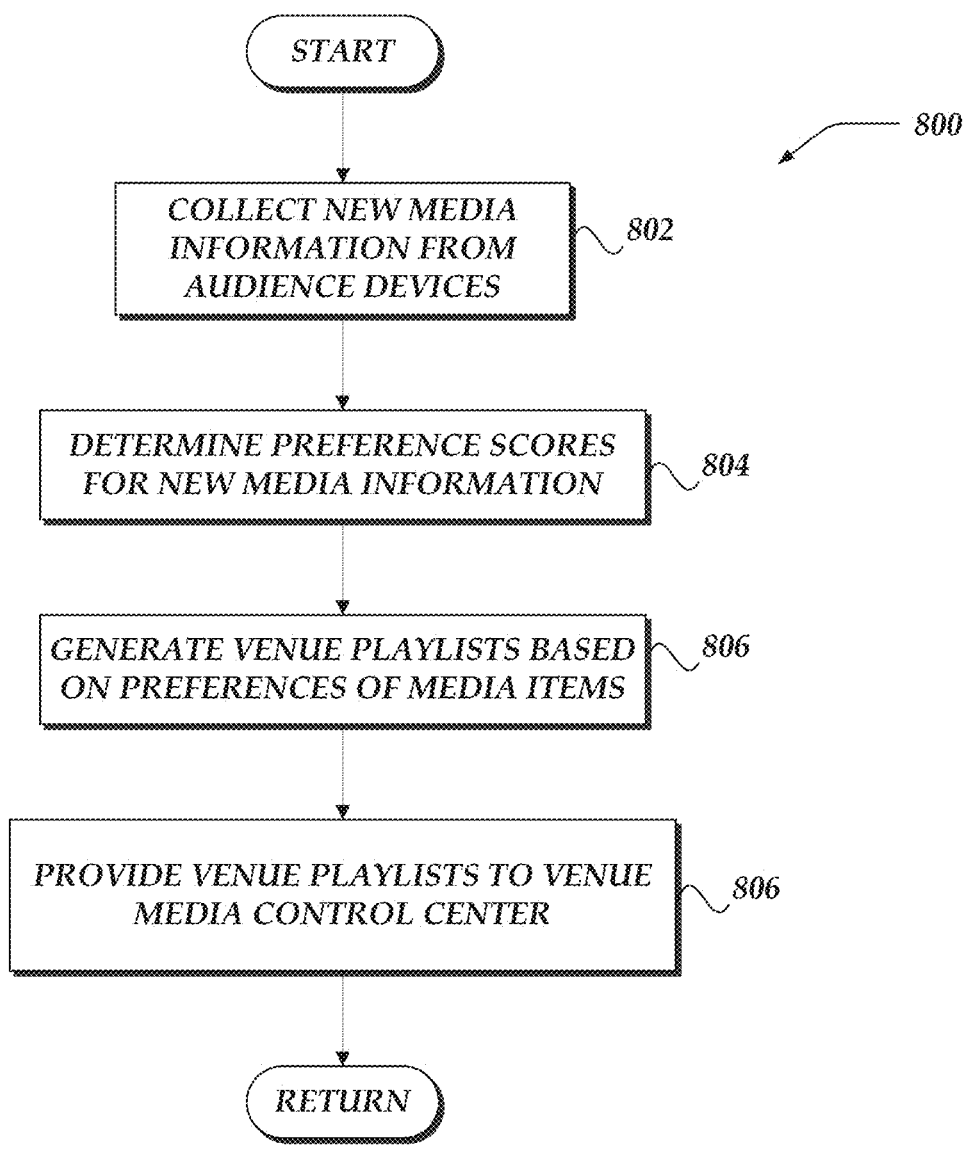
FIG. 8 shows an overview flowchart for a process for updating one or more venue playlists in accordance with at least one of the various embodiments.

FIG. 8 shows an overview flowchart for process 800 for updating one or more venue playlists in accordance with at least one of the various embodiments. After a start block, at block 802, in at least one of the various embodiments, one or more sets of new media information may be collected from one or more of the detected audience devices. As described above, media information from audience devices may be provided to a venue control server.

At block 804, in at least one of the various embodiments, preference scores may be determined for the media information. As described above, in at least one of the various embodiments, the media information from the audience devices may include audience member preference information for one or more media items. In at least one of the various embodiments, the venue control server may include a component such as a media information coordinator to process the media information to determine preference scores that represent audience members' preference for particular media items. Likewise, from the audience member preferences, the venue control server may be arranged generate one or more venue preference scores. As mentioned above, preference scores do not have to be represented as single value. In some embodiments, multiple factors may be considered together as a preference score rather than computing a single value.

In at least one of the various embodiments, an individual audience member's preference score represents how much an audience member prefers a given media item relative to the other media items included in the media information. In at least one of the various embodiments, the individual audience preferences may be employed to generate a venue preference that reflects how much the audience as a whole may prefer a particular media item.

At block 806, in at least one of the various embodiments, one or more venue playlists may be generated based on the audience device provided media information. The venue playlists may be arranged to reflect the preference scores for the individual media items referenced in the media information. In at least one of the various embodiments, there may be more than one venue playlists grouped by media genre, media duration/size, media quality, media type, media license types, or the like. Further, in some embodiments, different venue playlists may be generated for different kinds of events that may be held at the venue. Or, also, for different types of uses that may be consistent with a given event and/or type of event. For example, if the venue event is a sport competition there may be regular and expected breaks/time-outs/intermissions that may each require different media having different lengths, tempo, or the like.

In at least one of the various embodiments, additional information such as preferred/banned media may be used to filter and/or modify the venue playlists. In some embodiments, white lists may be used to list allowed media items. Likewise, in at least one of the various embodiments, black lists may list media items that may be excluded from playing in the in the venue. Further, in at least one of the various embodiments, configuration information, including rule-based policies may be used for filtering the venue playlists. In some embodiments, the filtering may override the preference system.

At block 808, in at least one of the various embodiments, the generated venue playlists may be made available to the venue control system. In at least one of the various embodiments, the venue control server may be arranged to provide the one or more playlist to a venue control system. In at least one of the various embodiments, the venue may include venue control system where one or more operators control if and when media items and/or portions of media items should be played in the venue. The venue playlists may be displayed in user-interface and/or integrated with a media control center to enable the operators to play the media listed in the venue playlists at appropriate times. Next, control may be returned to a calling process.

Figure 9:
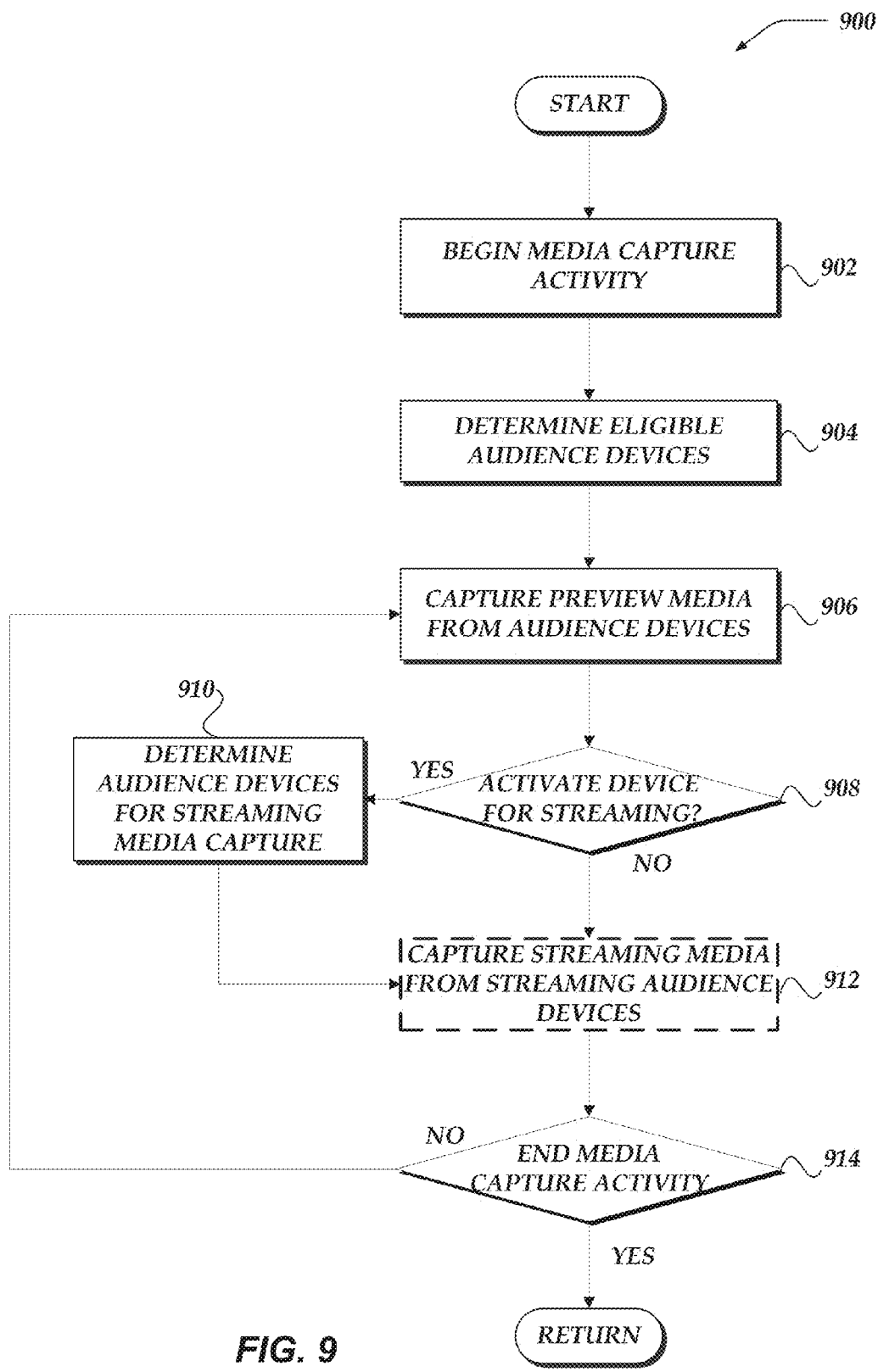
FIG. 9 shows an overview flowchart for a process for capturing streaming media from one or more audience devices in accordance with at least one of the various embodiments.

FIG. 9 shows an overview flowchart for process 900 for capturing streaming media from one or more audience devices in accordance with at least one of the various embodiments. In at least one of the various embodiments, media capture activities may be associated with or part of a pending interactive event.

After a start block, at block 902, in at least one of the various embodiments, media capture activity may begin. In at least one of the various embodiments, an audience device may receive a control message from a venue control server to initiate media capture. In at least one of the various embodiments, the control message may be processed by a client venue application that is installed on the audience device, such as, client venue application 217.

In at least one of the various embodiments, the control message may include information describing the type of media being requested as well as restrictions on media format, media quality, or the like. In some embodiments, the client venue application may determine the type of requested media and it associated requirement/restrictions based on the particular control message that is received. Accordingly, in such cases, the client venue application may provide media if it has the capability to generate media that conforms to the request restrictions.

At block 904, in at least one of the various embodiments, one or more eligible audience devices may be determined. In at least one of the various embodiments, not every audience device at the venue may be available to capture media. In some cases, one or more audience devices may not have installed, enabled, or activated the appropriate client venue applications. In other cases, in some embodiments, one or more audience devices may not have the features, specifications, or capabilities for capturing the requested media. For example, if the control message requests that high definition video be captured, audience devices that do not have high definition video capability may be excluded.

Likewise, in at least one of the various embodiments, other factors, such as, user preferences, battery strength, connection quality, or the like, of a particular audience device may be below a defined threshold and thus it may be excluded from the pending media capture activity.

At block 906, in at least one of the various embodiments, preview media may be captured using the one or more determined eligible audience devices. In at least one of the various embodiments, preview data may be static screenshots from video the audience device is recording, audio clips, downgraded thumbnails of captured images, or the like.

At decision block 908, if one or more audience devices should be activated for streaming media, control may flow block 910; otherwise, control may flow to block 912. In at least one of the various embodiments, the venue control server may determine based on the current state of the pending capture activity that one or more audience devices may begin stream media.

In at least one of the various embodiments, the capture activity may be associated with an interactive event that include features that enable user interactions that may be used in part to determine the one or more audience devices that may be selected to stream media.

At block 910, in at least one of the various embodiments, one or more audience devices may be determined for streaming media capture. In at least one of the various embodiments, the venue control server may be arranged to determine the one or more audience device that should provide streaming media. Accordingly, the venue control server will send control messages to the determined audience devices to request that they begin streaming media to the venue control server rather than sending preview information. In at least one of the various embodiments, audience devices not selected to stream media may continue to generate and provide preview media.

In at least one of the various embodiments, the venue control server will communicate with the client venue application to enable the determined audience devices to begin streaming media over the network.

At block 912, in at least one of the various embodiments, optionally, streaming media from the one or more audience devices that may be activated to serve streaming media may be captured. In at least one of the various embodiments, if audience devices have be selected to serve streaming media, the venue control server may capture the streaming media they are serving. In at least one of the various embodiments, venue control servers may include a media server application, such as, media server 321 that may be arranged to manage the capturing the streaming media being served by the one or more selected audience device over the networks.

This block is indicated as optional because in some cases there may be no audience devices selected to serve streaming media.

At decision block 914, in at least one of the various embodiments, if the streaming media capture activity is over, control may be returned to a calling process; otherwise, control may loop back to block 906. In at least one of the various embodiments, if the capture activity is finished the venue control server may provide control messages to the audience devices indicating the capture activity is over. Accordingly, in at least one of the various embodiments, the audience devices may stop providing streaming media and/or preview media.

Figure 10:
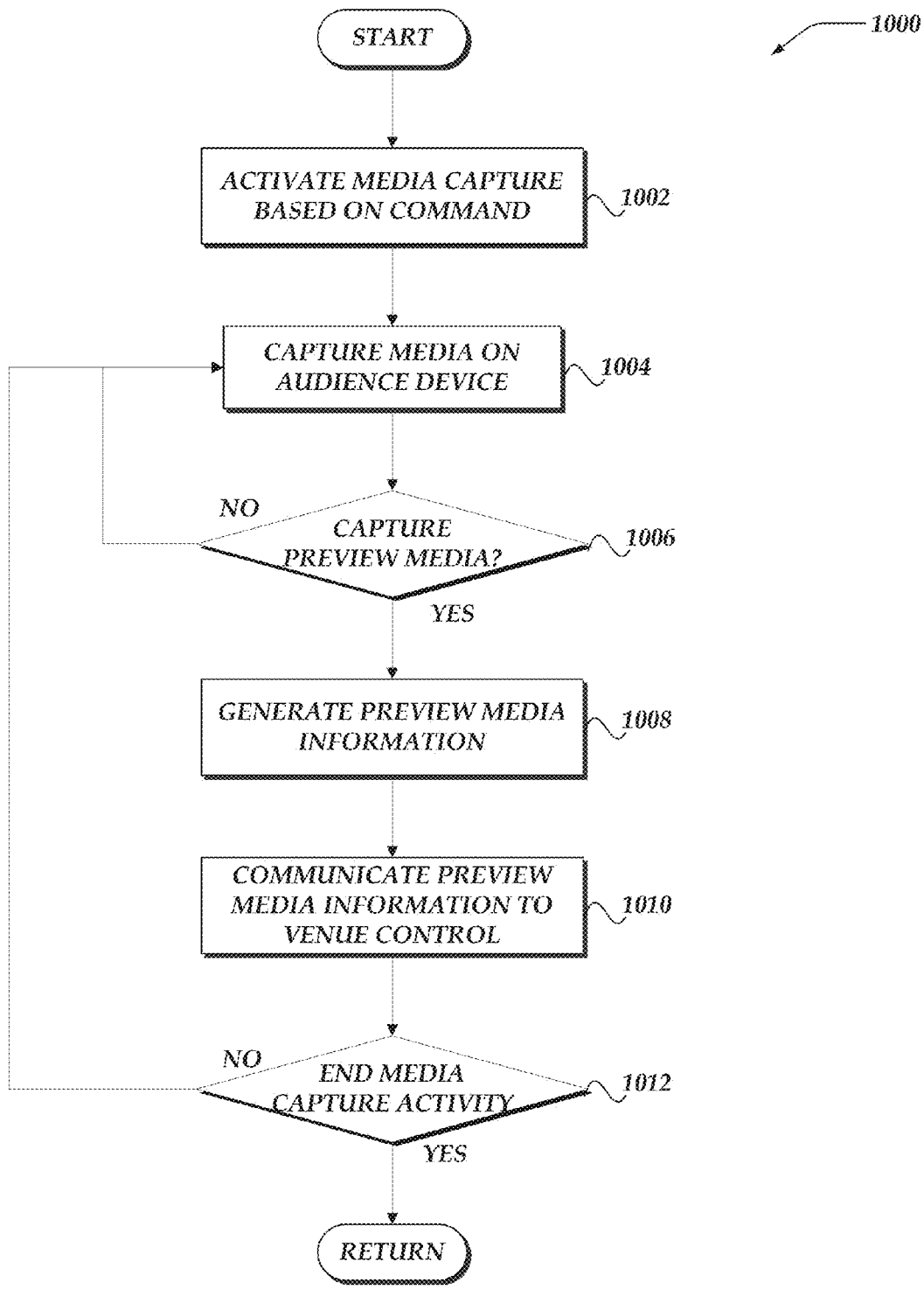
FIG. 10 shows an overview flowchart for a process for capturing preview media from one or more audience devices in accordance with at least one of the various embodiments.

FIG. 10 shows an overview flowchart for process 1000 for capturing preview media from one or more audience devices in accordance with at least one of the various embodiments. After a start block, at block 1002, in at least one of the various embodiments, a media capture activity may be started. In at least one of the various embodiments, a venue control server may provide control message to one or more audience devices to initiate a media capture session. In at least one of the various embodiments, media capture activities may be associated with or part of a pending interactive event.

At block 1004, in at least one of the various embodiments, the one or more audience devices may be begin capturing media on the device. In at least one of the various embodiments, the particular type of media that is captured may depend on information that may be included in the control message. For example, a control message may indicate that an audience device should begin capturing streaming video.

In at least one of the various embodiments, the client venue application installed on the audience devices may receive and/or process the control message. Accordingly, the client venue applications may provide and/or display context information on the audience devices to indicate the type of media that should be captured and the intended use/purpose for the captured media. For example, the client venue application may present a screen that indicates that videos of dancing audience members should be collected.

At decision block 1006, in at least one of the various embodiments, if the audience device should begin capturing/generating preview media information, control may flow to block 1008; otherwise, control may loop back to block 1004. As described above, most audience devices participating in a media capture event may be generating preview media information but some may be generating streaming media if directed to do so by the venue control server.

At block 1008, in at least one of the various embodiments, preview media information may be generated from the captured streaming media. As described, the composition of the preview media may depending the type of media that is being requested for capture. In at least one of the various embodiments, if the media capture event is for capturing video, the preview information may be screen shots, or short clips, taken from the video stream. In other cases, if the media capture event is for capturing audio, the preview media may be audio clips, or reduced quality audio streams. Likewise, if the media capture event is for capturing high resolution still images, the preview media may be reduced quality still images.

In at least one of the various embodiments, in addition to the preview media, additional information may be prepared for delivery to the venue control server, such as, user/device identifiers, geolocations, location of the audience device within the venue, audience device capabilities, or the like, or combination thereof.

At block 1010, in at least one of the various embodiments, the generated preview information may be communicated over a network to the venue control server. In at least one of the various embodiments, the preview media information may include the preview media and any additional information provided by the client venue application that may be related to the media or the audience device.

In at least one of the various embodiments, the preview media information may be sent at a defined interval. For example, an audience device may be configured to send video preview media at a rate of one frame per second. The preview media information send rate may vary depending on the type media, network capacity of the venue, the number participating audience devices, or the like. In at least one of the various embodiments, the send rate may be dynamically be adjusted based on the number of audience devices participating in the media capture session. For example, as less audience devices participate the send rates may increase while as more audience devices join the send rate may decrease. In at least one of the various embodiments, the actual functions for determining preview media send rates may be based on configuration information. Also, in at least one of the various embodiments, the venue control server may send control messages that modify/update the send rates of the preview media and/or preview media information.

At decision block 1012, in at least one of the various embodiments, if the media capture activity is ended, control may be returned to a calling process; otherwise, control may loop back to block 1004. In some embodiments, the venue control server may provide a control message that indicates that the capture event is over. Accordingly, the client venue application may receive the control message and direct the audience device to stop capturing media and to stop generating preview media information.

Figure 11:
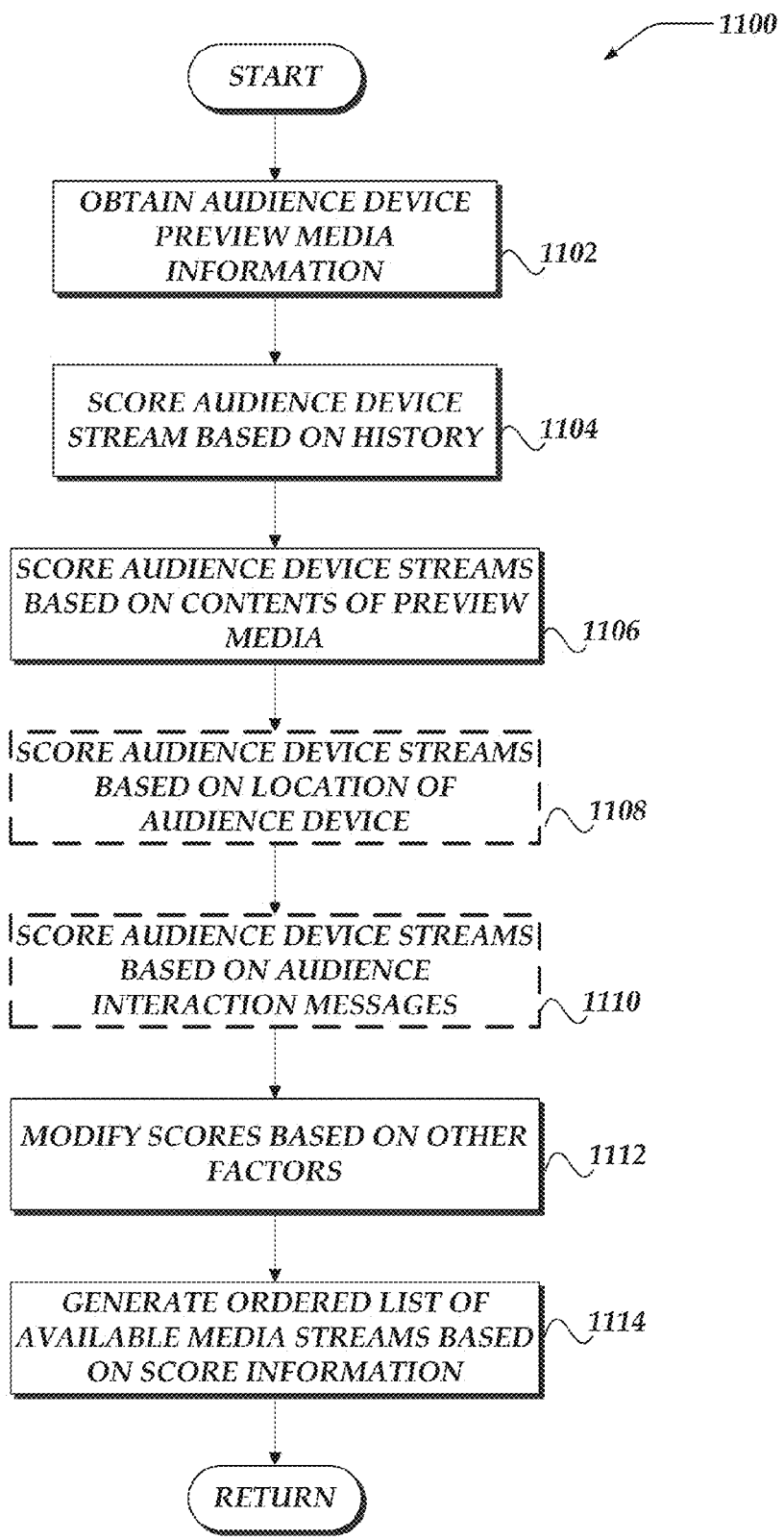
FIG. 11 shows an overview flowchart for a process for generating venue playlists in accordance with at least one of the various embodiments.

FIG. 11 shows an overview flowchart for process 1100 for generating venue playlists in accordance with at least one of the various embodiments. In at least one of the various embodiments, a venue control server may be arranged to evaluate the media that may be provided by audience devices. In at least one of the various embodiments, these evaluations may be employed to identify media that should be excluded from playing or displaying in the venue. Also, in at least one of the various embodiments, the evaluations may be used to help determine media that is most appropriate and/or preferred for displaying in the venue. In some embodiments, the venue control may generate playlists that are sorted best to worst to enable venue control operators to easily identify and select media for displaying in the venue. However, in some embodiments, the media may be automatically displayed in the venue after evaluation, sorting, and/or filtering.

After a start block, at block 1102, in at least one of the various embodiments, audience device preview media may be obtained from the one or more audience devices. As described above, the preview media information may include preview media as well as additional information associated with the audience devices and/or the users of the audience devices. Accordingly, in at least one of the various embodiments, preview media obtained by a venue control server may be associated with a particular audience device.

At block 1104, in at least one of the various embodiments, the media stream associated with the one or more audience devices may be scored based on past performance history of the audience device and/or the audience members that may be associated with the audience devices. In at least one of the various embodiments, one predictor of the quality and/or relevance of the provided media may be past performance. Accordingly, the audience device associated with preview media may be evaluated based on its past performance. Also, in some embodiments, one or more audience devices may be black listed and have their provided media discarded. In other cases, those audience devices that may have provided popular/relevant media in the past may be evaluated favorably. In at least one of the various embodiments, one or more audience devices may not have any history so their contributions may be considered neutral.

In at least one of the various embodiments, user history may be reflected in a user points system that may indicate a level of engagement of a user of an audience device. For example, in at least one of the various embodiments, each time a user provides media to the venue control server, the user may receive "points" for participating, even if their media is not selected and/or displayed in the venue. Accordingly, the more points a user has the more favorably their provided media may be evaluated. Likewise, in at least one of the various embodiments, the pending interactive activity may be arranged to generate "points" for a user the more times the user interacts with the interactive events presented by the venue control system.

Also, in at least one of the various embodiments, user history points may be accumulated based on how long the user remains at the venue. For example, the venue control server may issue more point to users that stay until the end of a sporting competition compared to those that leave early.

In at least one of the various embodiments, history may include the user's history with respect to one or more concessions and/or vendors within the venue. For example, the client venue application may be integrated with the venue point-of-sale system to enable points to be accumulated based on the amount refreshments, good and services, or the like, are purchased by the user at the venue.

At block 1106, in at least one of the various embodiments, audience device media streams may be scored based on the contents of their corresponding preview media. In at least one of the various embodiments, a venue control server may execute one or more image/audio processing algorithms, such as machine vision, or the like, to evaluate the contents of the preview media. In at least one of the various embodiments, preview media may be flagged or scored based on the results on the evaluation of its content.

In at least one of the various embodiments, the venue control server may process the preview media to determine the quality of the media. In some embodiments, if the media capture session is capturing video from the audience device, the preview media may be evaluated to determine if the video stream is shaky and/or steady. Likewise, the venue control server, may determine, if the contrast, white balance, images levels, color ranges, or the like, are within acceptable ranges as defined by one or more associated threshold values. Also, in at least one of the various embodiments, the contents of the preview media may be evaluated based on various features of the media, such as, color tone, brightness, dynamic range, feature detection (e.g., faces), or the like, or combination thereof.

In at least one of the various embodiments, the contents of the preview media may be scanned to look for signs of inappropriate content, such as, nudity, obscene gestures, foul language, or the like. In at least one of the various embodiments, one or more machine vision/machine learning techniques may be employed characterize the content of the preview media.

At block 1108, in at least one of the various embodiments, optionally, the audience device media streams may be scored based on location information corresponding to the audience device. In at least one of the various embodiments, location information of the audience device may be associated with the preview media. Accordingly, in some media capture sessions, the location may be relevant to evaluating the media. For example, the venue may include technology for provided interior location information, such as, iBeacons, Bluetooth LE beacons, near field communication (NFC), or the like, that may be used to provide micro-location information corresponding to audience devices.

In at least one of the various embodiments, audience devices may be provided venue seat location information of their user based on optically scanning seating information, season ticket holder seat information, or the like.

In at least one of the various embodiments, RFID tags may be associated with an audience member and/or an audience device. For example, audience members may be issued wristbands and/or tickets that include a RFID tag with a unique identifier. Accordingly, the RFID tag may be registered with a user's audience device to enable RFID tag sensors located in the venue to report the location of a user within the venue.

At block 1110, in at least one of the various embodiments, optionally, the audience device media streams may be scored based on audience interaction messages. In at least one of the various embodiments, some media capture sessions may coincide with interactive event, such as, a game, voting session, or the like. For example, the interactive event may be designed to let audience members vote for their favorite video stream using the client venue application on their audience device. Accordingly, in at least one of the various embodiments, media previews that are associated with favorable audience interaction messages (e.g., votes) may be evaluated more favorably than media previews that do not receive as many favorable user interaction messages.

At block 1112, in at least one of the various embodiments, the scores for the various media streams and/or audience device may be further evaluated based on one or more other factors. In at least one of the various embodiments, venue control server may be arranged to evaluate preview media based on various factors that may be tailored to the venue, the venue activity, or the like.

At block 1114, in at least one of the various embodiments, one or more playlists sorted based on the evaluations/scores for the audience devices may be generated. In at least one of the various embodiments, upon evaluation the provided preview streams may be grouped and/or ordered based on the evaluations. As described above, the ordered lists may be provided to an operator in a venue control center, or they may be used to automatically determine one or more media streams to display and/or play in the venue. Next, control may be returned to a calling process.

Figure 12:
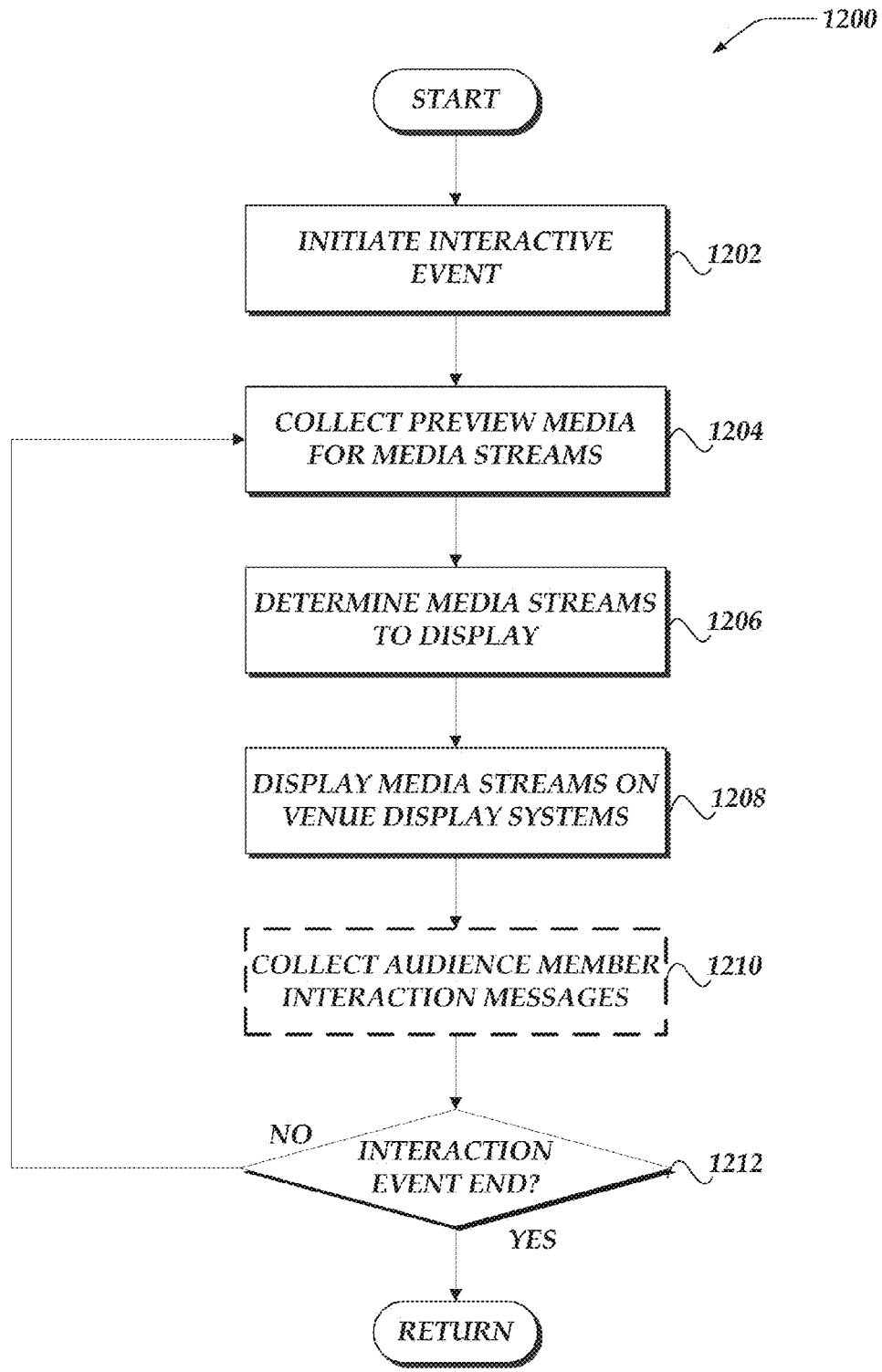
FIG. 12 shows an overview flowchart for a process for capturing streaming media from audience devices in accordance with at least one of the various embodiments.

FIG. 12 shows an overview flowchart for process 1200 for capturing streaming media from audience devices in accordance with at least one of the various embodiments. After a start block, at block 1202, in at least one of the various embodiments, a venue control server may initiate an interactive event that includes media capture. As described above, a venue control server may communicate one or more control messages to audience devices that indicate that an interactive event, such as, as a game, contest, poll, or the like, is about to start. Sometimes, the interactive event will involve participating audience members using their audience devices to capture media and provide it to the venue control server.

Accordingly, in at least one of the various embodiments, the venue control server may send control messages that indicate the type of media to capture and or the context (e.g., game/contest information). Also, context information may be displayed on video displays in the venue as well as provided over the public address system.

In at least one of the various embodiments, the client venue application of the audience devices may be arranged to recognize the control messages and provide instructions and/or context for the audience device users, including determining an appropriate skin for the user-interface of the client venue application. For example, if a control message indicates that a particular in-venue contest is about to start, the client venue application may display instructions on the audience device. Information included in the instructions (either from the client venue application or venue media outputs) may explain the rules/purpose of the interactive event and the type of media and desired content that should be captured.

At block 1204, in at least one of the various embodiments, preview media associated with one or more audience devices may be collected. As described above, audience devices that are participating in the interactive event may begin capturing media and generating preview media information. Accordingly, the venue control server may collect the preview media information from one or more of the participating audience devices.

At block 1206, in at least one of the various embodiments, one or more streaming media streams may be selected for display. In at least one of the various embodiments, the venue control server may determine media stream for display consistent with the rules and/or purpose of the pending interactive activity. In at least one of the various embodiments, the venue control server may evaluate the provided preview media information to determine which audience devices, if any, should be selected for serving streaming media.

In at least one of the various embodiments, the venue control server may be arranged to evaluate the preview media information based on the pending interactive event. For example, if the event is a contest to show the cutest baby, the venue control server may use machine vision to identify preview media information that includes human faces. Accordingly, in this example, all other considerations being equal, preview media information that is determined to include human faces may be scored and/or evaluated as preferred over preview media information that does not include human faces.

At block 1208, in at least one of the various embodiments, the selected media streams may be served by the selected audience device to one or more venue display systems. In at least one of the various embodiments, the preview media information may be ordered based on the scoring and/or evaluation to enable a venue control system operator to select a media stream from the ordered list.

In at least one of the various embodiments, the venue control server may be arranged to automatically select the audience device that will serve the media stream. For example, in some embodiments, if the interactive event requires four video streams to be displayed on the "big screen" video display, the venue control server may automatically select the audience device having the top four scored/evaluated streams to serve the streaming media to the venue video displays.

In at least one of the various embodiments, to display a media streams, the venue control server may provide a control message to the one or more determined audience devices indicating that they should begin serving the streaming media rather than providing preview media information.

Accordingly, in some embodiments, the venue control server may route the media streams served by the audience devices to a venue media control system that may display them on one or more of the venue display systems.

In at least one of the various embodiments, operators/users of the venue media control system may be enabled to manually select the media streams that are served by the audience devices and displayed in the venue. For example, if a currently an audience device is serving a displayed video stream that begins to lose quality or shows inappropriate content the operator may manually switch to another media stream.

At block 1210, in at least one of the various embodiments, optionally, audience member interaction messages may be collected. In at least one of the various embodiments, audience member interaction messages may be collected at the audience devices and provided to the venue control server over a network. In at least one of the various embodiments, the type of interactions will depend on the particular type of the pending interactive event. For example, the interaction event may enable audience members use the client venue application to "vote" for one or more of the media streams being displayed in on the venue displays. In at least one of the various embodiments, the particular interaction messages and their impact on the determining the displayed media stream will vary depending on the particular interactive event.

In at least one of the various embodiments, one or more interim results may be generated and displayed based on the interaction message communicated from the audience devices. For example, a running total of votes may be displayed as part of the interactive event.

At decision block 1212, in at least one of the various embodiments, if the interactive event is over, control may be returned to the calling process; otherwise, control may loop back to block 1204. In at least one of the various embodiments, at some point the interactive event may terminate. In some embodiments, there may be a defined time limit, in other cases, the event may be terminated by a venue control operator. For example, during a sporting competition there may be breaks or timeouts of a defined length. Accordingly, in this example, the interactive event may be active during the break or timeout with a defined timer or an operator terminating the interactive event at the end of the break/timeout.

Figure 13:
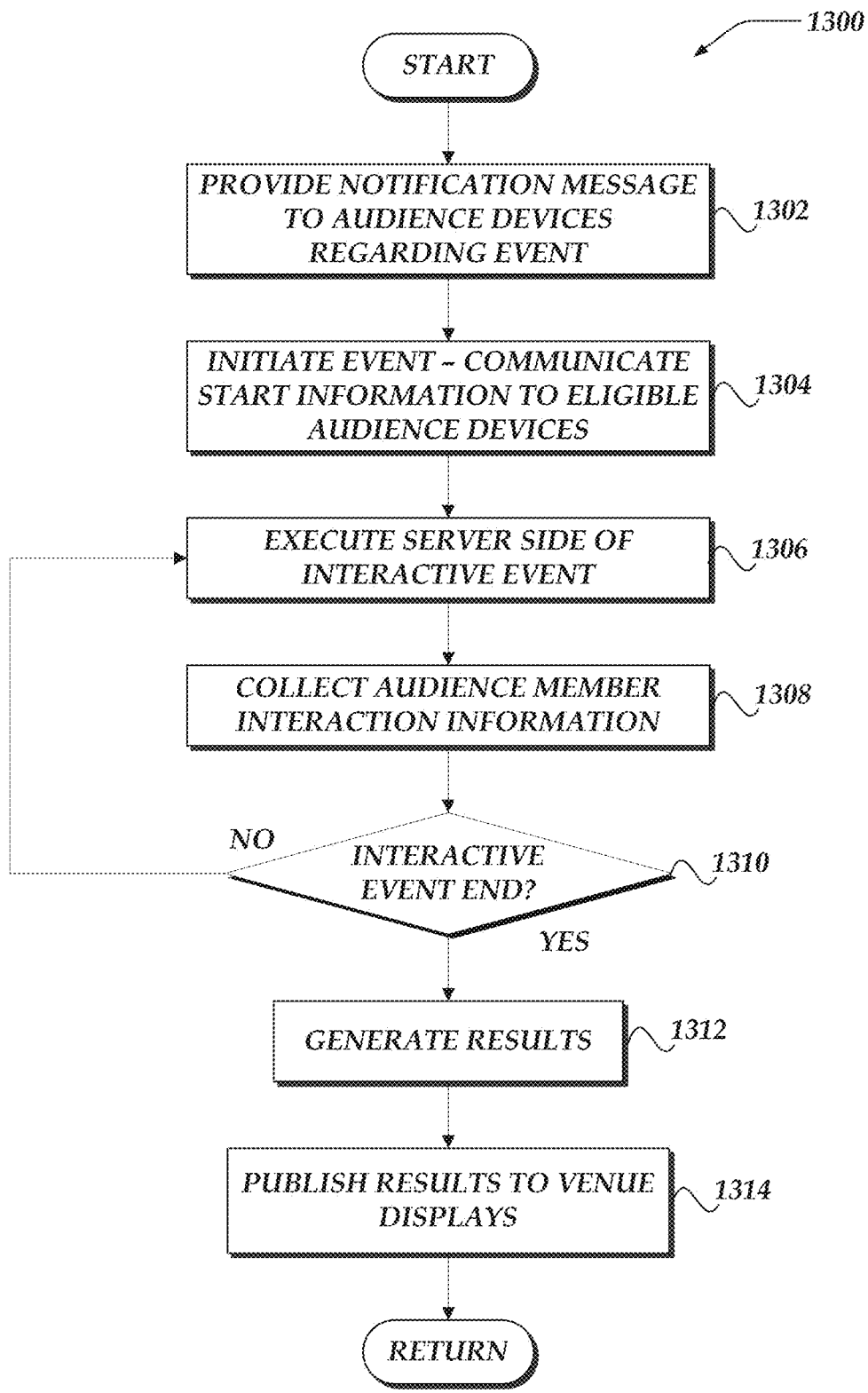
FIG. 13 shows an overview flowchart for a process for performing an interactive event in accordance with at least one of the various embodiments.

FIG. 13 shows an overview flowchart for process 1300 for performing an interactive event in accordance with at least one of the various embodiments. After a start block, at block 1302, in at least one of the various embodiments, notification messages that include information about the upcoming/pending interactive event may be provided to one or more audience devices. In at least one of the various embodiments, as described above, one or more audience devices may be registered with the venue control server. Likewise, in at least one of the various embodiments, a portion of the audience devices may be determined to be at the venue and to have been enabled to receive communication the venue control server. Accordingly, the venue control server may be arranged to communicate a notification message regarding the upcoming/pending interactive event to a determined number of eligible audience devices over one or more networks.

In at least one of the various embodiments, the venue control server may determine eligibility based on additional factors, such as, device capability, user history (e.g., black lists, white lists, or the like), random selection, or the like, or combination thereof. For example, if the interactive event requires high definition video and Wi-Fi connectivity, devices with these capabilities may be provided the notification messages while devices lacking these capabilities may be excluded from the event. Also, for example, rather than engage all audience devices in the interactive event, the interactive event may be configured to randomly select one or more audience device from the set of eligible audience devices to receive the notification message.

In at least one of the various embodiments, information for skinning the user interface of the client venue application may be determined and/or provided at described above.

At block 1304, in at least one of the various embodiments, the interactive event may be initiated by communicating a start message to the eligible audience devices. In at least one of the various embodiments, depending on the features of the interactive event, additional control messages may be send to trigger one or more features of the interactive event. For example, messages may be sent to enable users to begin capturing media with their audience devices, while other messages may be sent to enable users to begin voting on media displayed on the venue display screens.

In at least one of the various embodiments, the server side and the client side of the interactive may be arranged to work together to conduct the interactive event. Accordingly, the venue control server may send messages that are expected/known to the client venue application. Likewise, the venue control server may be expecting certain responses (e.g., interactive messages) from the client venue application that are particular to a given interactive event.

At block 1306, in at least one of the various embodiments, the interactive event may be executed. In at least one of the various embodiments, the venue control server (along with the media server, communication, and so on) may execute the interactive event. Accordingly, in at least one of the various embodiments, media from audience devices, graphical animations, music, text, or the like, may be displayed/played on one or more of the venue media output systems. In some embodiments, the interactive event may be executed without displaying or playing media in the venue. In such cases, the interactive event may be "played" using the client venue application and venue control server without displaying/playing media in the venue.

At block 1308, in at least one of the various embodiments, audience member interactions information (e.g., interaction messages) may be collected. In at least one of the various embodiments, interactive events may be designed to collect audience member inputs/feedback from their audience devices. Accordingly, in at least one of the various embodiments, for each particular interactive event, the client venue application may be arranged to enable audience members to interact with the interactive event by providing one or more interaction messages. In at least one of the various embodiments, the particular interactions may vary depending on the design of the pending interactive event, but they may include, touch screen inputs, shaking/motion inputs, audio inputs, or the like. For example, a user may be enabled to use their audience device to vote for one or more media streams that are displayed in the venue. Or, for example, users may be enabled to provide answers to poll questions, answers to trivia questions, provide text-based "shout-outs," or the like, depending on the particular pending interactive event.

In at least one of the various embodiments, depending on the arrangement of the interactive event, interim results based on the user interactions may be displayed to the audience using the venue media displays. Also, in at least one of the various embodiments, interim results may be displayed to the audience members using their audience devices (e.g., via way if the client venue application).

At decision block 1310, in at least one of the various embodiments, if the interactive event is completed, control may flow to block 1312; otherwise, control may loop back to block 1306. Also, At block 1312, in at least one of the various embodiments, one or more results associated with the completed interactive event may be generated. At the completion of the interactive event, the results, if any, may be tabulated, and stored. In some embodiments, the format, context, and/or meaning of the results may depend on the particular interactive event.

At block 1314, in at least one of the various embodiments, the results may be published by providing them the one or more venue displays. In some embodiments, the results may be displayed to the audience using the venue's display systems and/or the audience devices. Next, control may be returned to a calling process.

Figure 14:
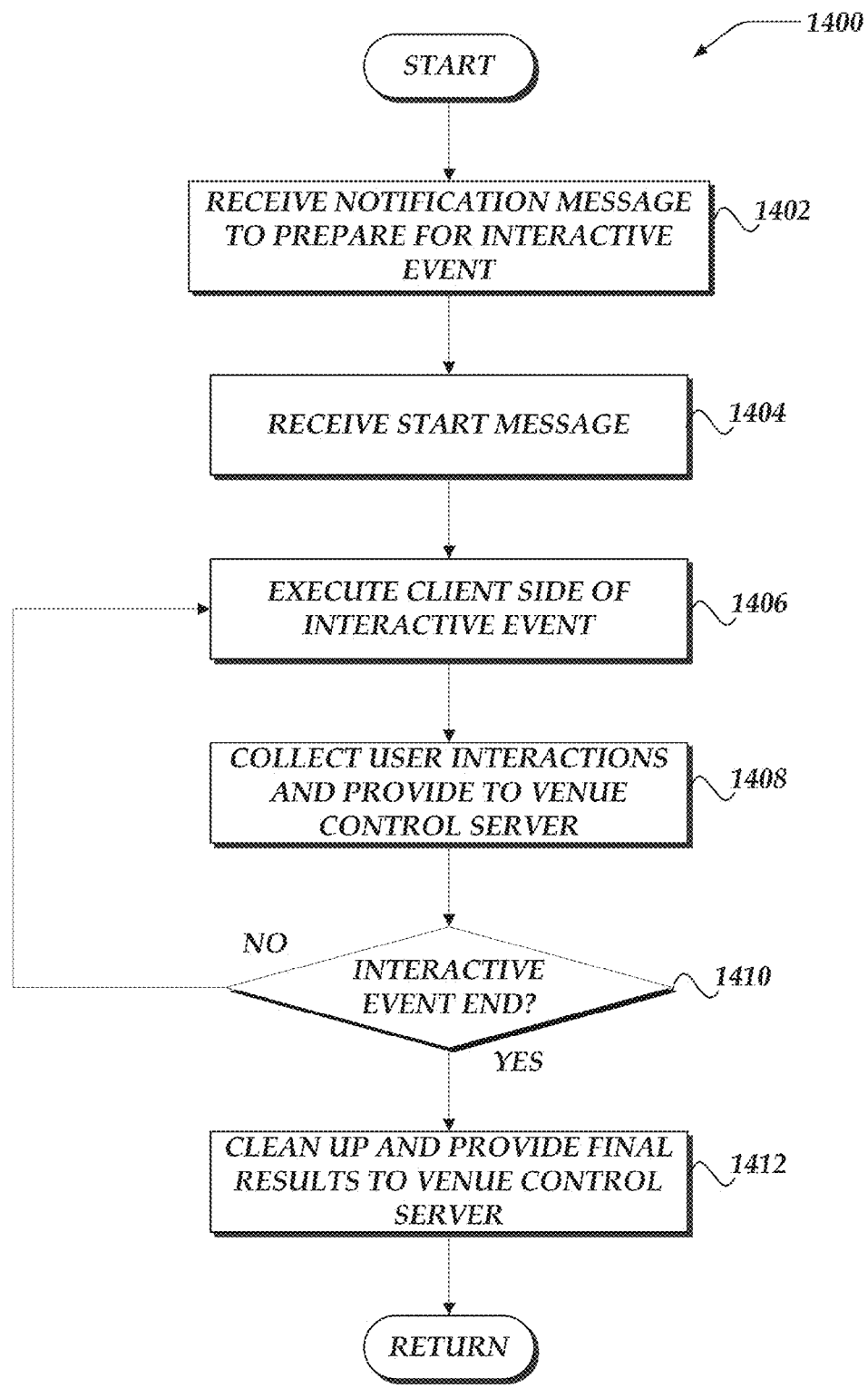
FIG. 14 shows an overview flowchart for a process for the performing an interactive event at an audience device in accordance with at least one of the various embodiments.

FIG. 14 shows an overview flowchart for process 1400 for the performing an interactive event at an audience device in accordance with at least one of the various embodiments. After a start block, at block 1402, in at least one of the various embodiments, notification messages that include information about the upcoming event may be provided by one or more venue control servers. As described above, in at least one of the various embodiments, one or more of the audience devices may receive notification message inviting them to participate in an interactive event.

In at least one of the various embodiments, audience members may decline to participate by providing a decline message in response to the notification message. In at least one of the various embodiments, an audience member may be enabled to generate a decline message using the client venue application executing on their audience device. Accordingly, the decline message may be provided to the venue control server over one or more networks. Or, in some embodiments, one or more audience members may be enabled decline by refusing to actively participate in the interactive event.

In at least one of the various embodiments, a user interface skin for the client venue application may be determined based on the particular interactive event. Accordingly, in at least one of the various embodiments, configuration information associated with the interactive event or provided in a control message, or the like, may be employed to the appropriate user interface skin for the interactive event.

At block 1404, in at least one of the various embodiments, a start message may be provided by one or more venue control server. As described above, the venue control server may provide a control message that indicates the pending interactive event has started. In at least one of the various embodiments, the client venue application executing on an audience device may receive this message and initiate the client side actions on the audience device corresponding to the interactive event.

At block 1406, in at least one of the various embodiments, the client-side portion of the interactive event may execute on the audience device. In at least one of the various embodiments, the client venue application may execute one or more actions to perform the client side of the interactive event. For example, in at least one of the various embodiments, the client venue application may be a smart phone application running natively on the audience devices. The client venue application may be arranged to generate one or more user-interface elements for communicating and interacting with the user of the audience device during the interactive event.

At block 1408, in at least one of the various embodiments, various user interactions with the audience device that are associated with the interaction event may be collected and provided as interaction messages to the one or more venue control server. In at least one of the various embodiments, the client venue application for a particular interactive event may be arranged to collect input from its user. This may include generating user-interface input elements that are displayed in a graphical user-interface on the audience devices' display. Also, in some embodiments, this may include collecting input information from audience device directly. For example, buttons, motion sensors, geo-location sensors, or the like may be employed to provide user input information to the client venue application.

In at least one of the various embodiments, as per the design of the pending interactive event, the client venue application may be arranged to enable the audience device to communicate some or all of the user interaction information to the venue control server using interaction messages. In some embodiments, the client venue application may aggregate one or more user interaction on an audience device into an interaction message before providing them to the venue control server. At decision block 1410, in at least one of the various embodiments, if the interactive event is over, control may flow to block 1412; otherwise, control may loop back to block 1406. Next, control may be returned to a calling process.

It will be understood that each block of the flowchart the illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor to provide steps for implementing the actions specified in the flowchart block or blocks. The computer program instructions may also cause at least some of the operational steps shown in the blocks of the flowcharts to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Additionally, in one or more steps or blocks, may be implemented using embedded logic hardware, such as, an Application Specific Integrated Circuit (ASIC), Field Programmable Gate Array (FPGA), Programmable Array Logic (PAL), or the like, or combination thereof, instead of a computer program. The embedded logic hardware may directly execute embedded logic to perform actions some or all of the actions in the one or more steps or blocks. Also, in one or more embodiments (not shown in the figures), some or all of the actions of one or more of the steps or blocks may be performed by a hardware microcontroller instead of a CPU. In at least one embodiment, the microcontroller may directly execute its own embedded logic to perform actions and access its own internal memory and its own external Input and Output Interfaces (e.g., hardware pins and/or wireless transceivers) to perform actions, such as System On a Chip (SOC), or the like.

What is claimed as new and desired to be protected by Letters Patent of the United States is:

1. A method for employing a network computer to manage communication over a network, wherein execution of logic by the network computer performs actions, comprising:
   determining a plurality of audience devices that are physically located at a venue;
   determining one or more audience devices that are eligible to participate in one or more interactive events at the venue based on one or more characteristics of the audience devices;
   validating that the one or more audience devices are eligible to participate in the one or more interactive events;
   determining a skin for a user interface that is displayed at each of the one or more eligible audience devices based on the one or more interactive events and the one or more characteristics of the one or more eligible audience devices, wherein the skinned user interface enables one or more users of the one or more eligible audience devices to participate in the one or more interactive events;
   in response to receiving, from the one or more eligible audience devices, one or more interaction messages that indicate participation in the one or more interactive events, performing further actions, including:
      generating one or more interim results associated with the one or more interactive events based on the one or more interaction messages; and
      displaying different types of content on one or more displays at the venue based on the one or more interim results and one or more venue playlists that are further based on:
         media items associated with an audience device score, wherein the audience device score is at least partially based on a length of time a particular audience device remains in the venue during a sports competition:
         a type of the one or more interactive events; and
         characteristics of a sports competition that is currently performing at the venue,
      wherein the different types of content also include different tempos and different lengths that correspond to one or more of breaks, timeouts, or intermissions for the sports competition that is currently performing; and
   in response to completing the one or more interactive events, generating a final result based on the one or more interim results, wherein the final result is also displayed as content on the one or more displays.

2. The method of claim 1, further comprising:
   obtaining media information from the one or more eligible audience devices, wherein the media information includes at least a list of media items that are preferred by the one or more users;
   generating the one or more venue playlists further based on the obtained media information; and
   determining media for presenting at the venue based on the one or more venue playlists.

3. The method of claim 1, further comprising:
   obtaining preview media provided by the one or more eligible audience devices;

selecting one of the one or more eligible audience devices based on one or more characteristics of its corresponding preview media;

obtaining streaming media for presentation at the venue, wherein the streaming media is served by the selected audience device; and wherein the validation of the one or more eligible audience devices is further based on one or more of a battery power preference, a streaming video preference provided by the one or more audience members, or an exchange of one or more handshake messages with the one or more audience devices to obtain a screen resolution for each of the one or more audience devices.

4. The method of claim 1, further comprising displaying one or more notification messages in the skinned user interface that indicates the one or more interactive events are pending at the venue for participation by the one or more users.

5. The method of claim 1, wherein the one or more interaction messages include information that indicates one or more preferences of the one or more users that correspond to the one or more interactive events.

6. The method of claim 1, further comprising:
generating one or more score values that are associated with the one or more users; and
modifying the one or more score values based on the participation by the one or more users in the one or more interactive events.

7. The method of claim 1, further comprising, modifying the one or more interim results based on, one or more of, a play history of media on the one or more eligible audience devices, a physical location in the venue of the one or more eligible audience devices, quality of media items provided by the one or more eligible audience devices, content of media items provided by the one or more eligible audience devices, or relevancy of the media items.

8. A system arranged for managing communication over a network, comprising:
a network computer, including:
a transceiver that communicates over the network;
a memory that stores at least instructions; and
a processor device that executes instructions that enable actions, including:
determining a plurality of audience devices that are physically located at a venue;
determining one or more audience devices that are eligible to participate in one or more interactive events at the venue based on one or more characteristics of the audience devices;
validating that the one or more audience devices are eligible to participate in the one or more interactive events;
determining a skin for a user interface that is displayed at each of the one or more eligible audience devices based on the one or more interactive events and the one or more characteristics of the one or more eligible audience devices, wherein the skinned user interface enables one or more users of the one or more eligible audience devices to participate in the one or more interactive events;
when one or more interaction messages that indicate participation in the one or more interactive events are provided by the one or more eligible audience devices, performing further actions, including:
generating one or more interim results associated with the one or more interactive events based on the one or more interaction messages; and
displaying different types of content on one or more displays at the venue based on the one or more interim results and one or more venue playlists that are further based on:
media items associated with an audience device score, wherein the audience device score is at least partially based on a length of time a particular audience device remains in the venue during a sports competition;
a type of the one or more interactive events and characteristics of a sports competition that is currently performing at the venue,
wherein the different types of content also include different tempos and different lengths that correspond to one or more of breaks, timeouts, or intermissions for the sports competition that is currently performing; and
when the one or more interactive events is completed, generating a final result based on the one or more interim results, wherein the final result is also displayed as content on the one or more displays; and
the one or more audience devices, that each include:
a transceiver that communicates over the network;
a memory that stores at least instructions; and
a processor device that executes instructions that enable actions, including: generating the one or more interaction messages.

9. The system of claim 8, wherein the network computer processor device enables actions, further comprising:
obtaining media information from the one or more eligible audience devices, wherein the media information includes at least a list of media items that are preferred by the one or more users;
generating the one or more venue playlists further based on the obtained media information; and
determining media for presenting at the venue based on the one or more venue playlists.

10. The system of claim 8, wherein the network computer processor device enables actions, further comprising:
obtaining preview media provided by the one or more eligible audience devices; selecting one of the one or more eligible audience devices based on one or more characteristics of its corresponding preview media;
obtaining streaming media for presentation at the venue, wherein the streaming media is served by the selected audience device; and
wherein the validation of the one or more eligible audience devices is further based on one or more of a battery power preference, a streaming video preference provided by the one or more audience members, or an exchange of one or more handshake messages with the one or more audience devices to obtain a screen resolution for each of the one or more audience devices.

11. The system of claim 8, wherein the network computer processor device enables actions, further comprising, displaying one or more notification messages in the skinned user interface that indicates the one or more interactive events are pending at the venue for participation by the one or more users.

12. The system of claim 8, wherein the one or more interaction messages include information that indicates one or more preferences of the one or more users that correspond to the one or more interactive events.

13. The system of claim 8, wherein the network computer processor device enables actions, further comprising:

generating one or more score values that are associated with the one or more users; and modifying the one or more score values based on the participation by the one or more users in the one or more interactive events.

14. The system of claim 8, wherein the network computer processor device enables actions, further comprising, modifying the one or more interim results based on, one or more of, a play history of media on the one or more eligible audience devices, a physical location in the venue of the one or more eligible audience devices, quality of media items provided by the one or more eligible audience devices, content of media items provided by the one or more eligible audience devices, or relevancy of the media items.

15. A network computer that manages communication, comprising:

a transceiver that communicates over the network;

a memory that stores at least instructions; and a processor device that executes instructions that enable actions, including:

determining a plurality of audience devices that are physically located at a venue;

determining one or more audience devices that are eligible to participate in one or more interactive events at the venue based on one or more characteristics of the audience devices;

validating that the one or more audience devices are eligible to participate in the one or more interactive events;

determining a skin for a user interface that is displayed at each of the one or more eligible audience devices based on the one or more interactive events and the one or more characteristics of the one or more eligible audience devices, wherein the skinned user interface enables one or more users of the one or more eligible audience devices to participate in the one or more interactive events;

when one or more interaction messages that indicate participation in the one or more interactive events are provided by the one or more eligible audience devices, performing further actions, including:

generating one or more interim results associated with the one or more interactive events based on the one or more interaction messages; and displaying different types of content on one or more displays at the venue based on the one or more interim results and one or more venue playlists that are further based on;

media items associated with an audience device score, wherein the audience device score is at least partially based on a length of time a particular audience device remains in the venue during a sports competition;

a type of the one or more interactive events; and characteristics of a sports competition that is currently performing at the venue;

wherein the different types of content also include different tempos and different lengths that correspond to one or more of breaks, timeouts, or intermissions for the sports competition that is currently performing; and when the one or more interactive events is completed, generating a final result based on the one or more interim results, wherein the final result is also displayed as content on the one or more displays.

16. The network computer of claim 15, wherein the processor device enables actions, further comprising:

obtaining media information from the one or more eligible audience devices, wherein the media information includes at least a list of media items that are preferred by the one or more users;

generating the one or more venue playlists further based on the obtained media information; and determining media for presenting at the venue based on the one or more venue playlists.

17. The network computer of claim 15, wherein the processor device enables actions, further comprising:

obtaining preview media provided by the one or more eligible audience devices;

selecting one of the one or more eligible audience devices based on one or more characteristics of its corresponding preview media;

obtaining streaming media for presentation at the venue, wherein the streaming media is served by the selected audience device; and wherein the validation of the one or more eligible audience devices is further based on one or more of a battery power preference, a streaming video preference provided by the one or more audience members, or an exchange of one or more handshake messages with the one or more audience devices to obtain a screen resolution for each of the one or more audience devices.

18. The network computer of claim 15, wherein the processor device enables actions, further comprising, displaying one or more notification messages in the skinned user interface that indicates the one or more interactive events are pending at the venue for participation by the one or more users.

19. The network computer of claim 15, wherein the one or more interaction messages include information that indicates one or more preferences of the one or more users that correspond to the one or more interactive events.

20. The network computer of claim 15, wherein the processor device enables actions, further comprising:

generating one or more score values that are associated with the one or more users; and modifying the one or more score values based on the participation by the one or more users in the one or more interactive events.

21. The network computer of claim 15, wherein the processor device enables actions, further comprising, modifying the one or more interim results based on, one or more of, a play history of media on the one or more eligible audience devices, a physical location in the venue of the one or more eligible audience devices, quality of media items provided by the one or more eligible audience devices, content of media items provided by the one or more eligible audience devices, or relevancy of the media items.

22. A processor readable non-transitory storage media that includes instructions for managing communication, wherein execution of the instructions by a processor device enables actions, comprising:

determining a plurality of audience devices that are physically located at a venue;

determining one or more audience devices that are eligible to participate in one or more interactive events at the venue based on one or more characteristics of the audience devices;

validating that the one or more audience devices are eligible to participate in the one or more interactive events;

determining a skin for a user interface that is displayed at each of the one or more eligible audience devices based on the one or more interactive events and the one or more characteristics of the one or more eligible audience devices, wherein the skinned user interface enables one or more users of the one or more eligible audience devices to participate in the one or more interactive events;

when one or more interaction messages that indicate participation in the one or more interactive events are provided by the one or more eligible audience devices, performing further actions, including:
- generating one or more interim results associated with the one or more interactive events based on the one or more interaction messages; and
- displaying different types of content on one or more displays at the venue based on the one or more interim results and one or more venue playlists that are further based on:
  - media items associated with an audience device score, wherein the audience device score is at least partially based on a length of time a particular audience device remains in the venue during a sports competition;
  - a type of the one or more interactive events; and
  - characteristics of a sports competition that is currently performing at the venue,
  - wherein the different types of content also include different tempos and different lengths that correspond to one or more of breaks, timeouts, or intermissions for the sports competition that is currently performing; and when the one or more interactive events is completed, generating a final result based on the one or more interim results, wherein the final result is also displayed as content on the one or more displays.

23. The media of claim 22, further comprising:
obtaining media information from the one or more eligible audience devices, wherein the media information includes at least a list of media items that are preferred by the one or more users;
generating the one or more venue playlists further based on the obtained media information; and
determining media for presenting at the venue based on the one or more venue playlists.

24. The media of claim 22, further comprising:
obtaining preview media provided by the one or more eligible audience devices;
selecting one of the one or more eligible audience devices based on one or more characteristics of its corresponding preview media;
obtaining streaming media for presentation at the venue, wherein the streaming media is served by the selected audience device; and
wherein the validation of the one or more eligible audience devices is further based on one or more of a battery power preference, a streaming video preference provided by the one or more audience members, or an exchange of one or more handshake messages with the one or more audience devices to obtain a screen resolution for each of the one or more audience devices.

25. The media of claim 22, further comprising displaying one or more notification messages in the skinned user interface that indicates the one or more interactive events are pending at the venue for participation by the one or more users.

26. The media of claim 22, wherein the one or more interaction messages include information that indicates one or more preferences of the one or more users that correspond to the one or more interactive events.

27. The media of claim 22, further comprising:
generating one or more score values that are associated with the one or more users; and
modifying the one or more score values based on the participation by the one or more users in the one or more interactive events.

28. The media of claim 22, further comprising, modifying the one or more interim results based on, one or more of, a play history of media on the one or more eligible audience devices, a physical location in the venue of the one or more eligible audience devices, quality of media items provided by the one or more eligible audience devices, content of media items provided by the one or more eligible audience devices, or relevancy of the media items.

* * * * *